United States Patent
Nakazawa et al.

(10) Patent No.: US 10,884,008 B2
(45) Date of Patent: Jan. 5, 2021

(54) DEVICE FOR STORING BIOCHEMICAL REAGENTS, AND BIOCHEMICAL ANALYZER

(71) Applicant: HITACHI HIGH-TECHNOLOGIES CORPORATION, Tokyo (JP)

(72) Inventors: Taro Nakazawa, Tokyo (JP); Motohiro Yamazaki, Tokyo (JP); Tatsuya Yamashita, Tokyo (JP); Yoshitaka Kodama, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 571 days.

(21) Appl. No.: 15/309,550

(22) PCT Filed: Apr. 27, 2015

(86) PCT No.: PCT/JP2015/062693
§ 371 (c)(1),
(2) Date: Nov. 8, 2016

(87) PCT Pub. No.: WO2015/186454
PCT Pub. Date: Dec. 10, 2015

(65) Prior Publication Data
US 2017/0138974 A1 May 18, 2017

(30) Foreign Application Priority Data
Jun. 5, 2014 (JP) .................................. 2014-117089

(51) Int. Cl.
*B01L 3/00* (2006.01)
*G01N 35/10* (2006.01)
(Continued)

(52) U.S. Cl.
CPC .... *G01N 35/1002* (2013.01); *B01L 3/502715* (2013.01); *B01L 3/523* (2013.01);
(Continued)

(58) Field of Classification Search
CPC .............. B01L 3/50273; B01L 3/502; B01L 2400/0481; B01L 2400/0683;
(Continued)

(56) References Cited

U.S. PATENT DOCUMENTS 3,497,320 A 2/1970 Blackburn et al.
6,531,282 B1 3/2003 Dau et al.
(Continued)

FOREIGN PATENT DOCUMENTS

EP 2 138 233 A1 12/2009
JP 53-5555 B1 2/1978
(Continued)

OTHER PUBLICATIONS

International Search Report, dated Jul. 7, 2015, which issued during the prosecution of International Application No. PCT/JP2015/062693, which corresponds to the present application.
(Continued)

*Primary Examiner* — Jill A Warden
*Assistant Examiner* — Dwayne K Handy
(74) *Attorney, Agent, or Firm* — Baker Botts L.L.P.

(57) ABSTRACT

Provided are: a device for storing biochemical reagents wherein an amount of a reagent can be hermetically stored and dropped from a storage site without coming into contact with the outside air; and a biochemical analyzer using the device. The device (10) is constituted by: sticking a top sheet (32) to a base sheet (31) provided with a convex-shaped hollow pocket (16) in which a reagent can be housed; a reagent container as a PTP packaging sheet (30) wherein an opening of the pocket in the base sheet (31), in which a reagent is preliminarily housed, is hermetically sealed with the top sheet (32); and sticking the film sheet surface as the top sheet (32) of the PTP packaging sheet (30), in which the reagent is hermetically packaged, to a cartridge surface of a
(Continued)

device body (20) to thereby hermetically seal the inside of the device body too.

5 Claims, 12 Drawing Sheets

(51) Int. Cl.
  *B01L 7/00* (2006.01)
  *G01N 35/00* (2006.01)
(52) U.S. Cl.
  CPC ........... *B01L 7/52* (2013.01); *B01L 2200/027* (2013.01); *B01L 2200/16* (2013.01); *B01L 2300/0816* (2013.01); *B01L 2300/0867* (2013.01); *B01L 2300/0887* (2013.01); *B01L 2300/1822* (2013.01); *B01L 2400/0481* (2013.01); *B01L 2400/0633* (2013.01); *B01L 2400/0683* (2013.01); *G01N 2035/00158* (2013.01); *G01N 2035/1041* (2013.01)
(58) Field of Classification Search
  CPC ......... B01L 3/502715; B01L 2200/027; G01N 35/10; G01N 35/1002
  See application file for complete search history.

(56) References Cited

U.S. PATENT DOCUMENTS

| 2002/0058332 | A1* | 5/2002 | Quake ................ G01N 15/1459 |
| | | | 435/288.5 |
| 2004/0018116 | A1* | 1/2004 | Desmond .............. B01L 3/5027 |
| | | | 422/502 |
| 2010/0124624 | A1 | 5/2010 | Tanaami et al. |
| 2011/0135546 | A1 | 6/2011 | Kurowski et al. |
| 2011/0186466 | A1 | 8/2011 | Kurowski et al. |

FOREIGN PATENT DOCUMENTS

| JP | 63-315956 A | 12/1988 |
| JP | 2010-137215 A | 6/2010 |
| JP | 2011-47755 A | 3/2011 |
| JP | 2011-524313 A | 9/2011 |
| JP | 2011-524815 A | 9/2011 |

OTHER PUBLICATIONS

Office Action, dated Jul. 16, 2019, which issued during the prosecution of German Patent Application No. 112015002018.7, which corresponds to the present application.

* cited by examiner

<A> Sample DEVICE

<B> Negative Control DEVICE

<C> Positive Control DEVICE

<D> Ladder DEVICE

DEVICE FOR STORING BIOCHEMICAL REAGENTS, AND BIOCHEMICAL ANALYZER

CROSS REFERENCE TO PRIOR APPLICATIONS

This application is a U.S. National Phase application under 35 U.S.C. § 371 of International Application No. PCT/JP2015/062693, filed on Apr. 27, 2015, which claims benefit of priority to Japanese Application No. 2014-117089, filed on Jun. 5, 2014. The International Application was published in Japanese on Dec. 10, 2015 as WO 2015/186454 A1 under PCT Article 21(2). The contents of the above applications are hereby incorporated by reference.

TECHNICAL FIELD

The present invention relates to a device for storing biochemical reagents in which reagents used in a biochemical analysis can be stored and can be used in the biochemical analysis as it is, and a biochemical analyzer that performs biochemical analysis using the device for storing reagents.

BACKGROUND ART

As a utilization technique of the biochemical analysis, an application using a nucleic acid analysis is put into practical use in the field of a forensic science, an immigration management, anti-terrorism and the like. For example, in the forensic science, a short tandem repeat (STR) analysis is put into practical use. Since the STR analysis is an analysis that analyzes a repetitive base sequence (STR) of a region of genome, the length of the STR base sequence is individual-specific, and the STR analysis is used in a DNA test, such as a personal identification and a parentage diagnosis.

PTL 1 discloses a method for performing the STR analysis of thirteenth types of gene locus (Locus) regions specified by United States Federal Bureau of Investigation (FBI) at a time. The STR analysis is generally performed in the order of a DNA sampling, DNA amplification, a DNA denaturation, a separation of DNA fragments (pieces), and a detection of DNA fragments.

In the STR analysis, as a sample preparation for performing the separation process and the detection process of DNA fragments, first, the DNA sampling process, the DNA amplification process, and the DNA denaturation process are sequentially performed, a nucleic acid (in many cases, DNA) as a template is extracted from a biological sample or a sample of organism-derived substances, the extracted template DNA is amplified by the PCR reaction (polymerase chain reaction), and a double strand of the amplified template DNA is denatured into a single strand by a formamide denaturation treatment or a heat denaturation treatment using heating and rapid cooling.

At that time, in the DNA amplification process, a multiplex PCR amplification is performed on a single measuring DNA sample, using thirteen types of primer sets. In addition, during the PCR amplification, the DNA fragments as amplified products are labeled. The PCR reaction is used as an effective amplifying method, in a process of amplifying the nucleic acid sample (in the STR analysis, the template DNA) generally capable of being extracted only in a small amount to an extent capable of being detected by a detector.

In the STR analysis, after performing such a sample preparation, the separation process of DNA fragments is performed, the labeled DNA fragments are separated by electrophoresis, the detection process of DNA fragments is performed, and the electrophoretic patterns of the obtained separation DNA fragments are detected and analyzed.

Incidentally, in each process of the STR analysis, in regard to the separation process of the DNA fragments and the detection process of the DNA fragments, automation has been actively performed by a DNA sequencer or the like that is widely known by a human genome analysis until now. Meanwhile, in general, the sample preparation has been manually performed by skilled persons until now.

Recently, by automating the sample preparation, in many genetic analyses including the STR analysis, there has been an attempt to perform the analyses in more cases, rather than being performed only by a limited facility and expert. For example, as a method of mixing the reagent that is essential in the sample preparation, in an automatic analyzer or the like disclosed in PTL 2, a pipette type dispensing work using a dispensing robot is adopted. In this case, the dispensing robot is a robot unit that two-dimensionally or three-dimensionally drives an arm (a manipulator) within a certain range of the analyzer, and automatically performs suction and discharge of liquid by a nozzle or a tip detachably attached to the arm tip, and the dispensing robot is one of automated techniques frequently used in biochemical analyzer, including a medical analysis.

CITATION LIST

Patent Literature

PTL 1: U.S. Pat. No. 6,531,282 B1
PTL 2: JP 63-315956 A

SUMMARY OF INVENTION

Technical Problem

Meanwhile, when using the biochemical analyzer in the field of genetic analysis, since DNA and RNA are often treated as a sample in the sample preparation, there is a need for a countermeasure for preventing the incorporation of DNA or RNA (hereinafter, also referred to as contamination) other than the sample at the time of mixing of reagents. In particular, in the PCR reaction, to amplify the small amount of template DNA as a mold, when DNA other than the analysis target contaminates DNA of the analysis target before the PCR reaction, there is a high possibility that a fatal erroneous analysis may be generated in the analysis results.

Therefore, when manually performing the sample preparation of the STR analysis process, in general, a room for treating DNA such as collection and extraction of the DNA sample in the STR analysis process, and a laboratory for performing the subsequent PCR reaction are separately provided, and the work is performed under a clean bench such that DNA floating in the air does not enter the sample when opening and closing the sample tube. Further, when automatically performing the sample preparation of the STR analysis process, for example, by performing cleaning of the nozzle of the arm tip or disposability of the tip as in the pipette type dispensing work using the dispensing robot disclosed in PTL 2, the contamination of the DNA other than the analysis target is prevented.

However, in the pipette type dispensing work using the dispensing robot, during a period from suction of reagents from the reagent bottle to dripping into the device, the nozzle or the tip containing the reagents are moved in the atmosphere (in the air) in the analyzer provided with the dispensing robot. Meanwhile, since DNA floats in the air in the dried state, when a series of works of the dispensing robot, such as suction and movement of reagents and dripping of reagent is performed in the atmosphere in which there is a concern of floating of DNA other than the analysis target, the floating DNA other than the analysis target may contaminate the reagent. Therefore, in the pipette type dispensing work using the dispensing robot, it is very difficult to prevent such contamination due to outside air. Moreover, even if the atmosphere of the analyzer exposed to the outside air and provided with the dispensing robot is attempted to be operated in a vacuum state, by paying attention only to prevention of floating of DNA, since the dispensing robot is configured to control the suction and dripping of reagents with the air layer interposed therebetween, the analyzer is not substantially operable.

Further, when the analyzer includes a dispensing robot equipped with a nozzle or a tip, since the arm provided with the nozzle or the tip is moved, for example, on the base of the coordinate axis such as XYZ axes or rθZ axes, a moving space of the arm is also required in the analyzer, and since there is a need to add a cleaning function for cleaning process of the nozzle or the tip to the analyzer, it is difficult to reduce the dimension of the analyzer.

Consequently, in the analyzer, these problems are factors that make it difficult to achieve compactness, reductions in device cost and running cost, and an improvement in treatment properties of the device, including the contamination prevention.

Meanwhile, in recent years, studies on chemical reaction, synthesis, purification, extraction, generation and analysis of the substance such as reagents in a small space using a micro fluidic device have been advanced. The micro fluidic device may be applied to a wide range of applications, including the gene analysis and the like, and the device has advantages in that the consumption of sample and reagent is small, portability when setting various reagents is simplified, and the device itself is disposable, as compared to conventional analyzers.

Thus, if it is possible to perform the reaction process in a sealed device by containing all the reagents in the sealed device, in regard to the problem of the erroneous analysis due to the contamination of floating DNA in the outside air under the user's management, it is also anticipated that a user's countermeasure including the treatment of samples and reagent is facilitated, and its use is expected even in the biochemical analysis fields, including the gene analysis, the medical analysis and the like.

However, in practice, despite that various micro fluidic devices are devised, in the fields of biochemical analysis including the genetic analysis fields, the sample preparation technique of applying the micro fluidic devices is not a mainstream.

As the cause thereof, even if it is attempted to apply the micro fluidic device to the sample preparation technique of the biochemical analysis field, there are following problems:

1) It is difficult to store the reagents in the sealed device and to drip the reagents, without being exposed to the outside air from the storage location, 2) It is difficult to store a small amount of reagents or drip the reagents, and 3) It is not possible to manufacture a device that solves the problems 1) and 2) at low cost.

Especially, considering that the micro fluidic device is treated as consumables in view of its features, the problem that the device for storing reagent may not be manufactured at low cost and the purchase price of the device increases is a great disadvantage for users of the analyzer.

The present invention has been made to provide the following objects in view of the above-described problems in the case of using the micro fluidic device in the pretreatment technique of the biochemical analysis field:

i) To provide a device for storing biochemical reagent that is capable of hermetically storing a small amount of reagent, and is capable of dripping the reagents, without being exposed to the outside air from the storage location, ii) To provide a biochemical analyzer that automatically performs a sample preparation of the biochemical analysis field, using the device for storing biochemical reagent, and iii) To provide an inexpensive device for storing biochemical reagent according to i) and ii).

In the aforementioned objects, the term "hermetically" mentioned i) represents a device structure for contamination prevention of various substances which affects the analysis results from the outside air under the treatment environment of the device in which the reagent is stored, such as a permeation prevention of water vapor contained in the outside air into the device, an oxidation prevention of the reagents due to contact with the outside air, and light-shielding to the outside of the device, in order to prevent the functions of the reagent stored in the device from being impaired.

In this case, the outside air, for example, refers to the atmosphere that easily causes the contamination, under the treatment environment of the device in which the reagent is stored, such as the transportation environment from the device manufacturer business to the user, the storage environment after the user owns the device, and analysis usage environment of the user's hand.

Therefore, the environment of the reagent manufacturer that manufactures the reagent, and the environment in the device manufacturer that performs the enclosing of the reagent and manufacturing of the device can be managed for contamination prevention and the deterioration prevention of enclosed reagents under the responsibility of the manufacturer. Therefore, it is possible to remove the environments from the treatment environment of the device in which the reagent is stored. Similarly, since the environment when the user separately encloses the sample to be measured in the device as necessary can also be managed for the contamination prevention and the deterioration prevention of the enclosed reagents under the user's responsibility for the customization of the device, it is possible to remove the environments from the treatment environment of the device in which the reagent is stored.

Next, in the aforementioned objects, the term 'small amount of reagent' described in i) represents that the amount of reagent enclosed in the device by the device manufacturer and stored within the device is an amount that is equal to or greater than a minimum of a required amount of reagent for use in the biochemical analysis or a minimum or more that does not unnecessarily exceed the minimum, and when the reagents stored at the time of analysis is used in the biochemical analysis, the minimum of the required amount can be dripped without any lack.

This is due to the fact that the reagent stored within the device and provided to the user as a device for storing biochemical reagent is generally expensive. Specifically, if the device, for example, is a device for DNA analysis that is used in the sample preparation of the DNA analysis, as the reagents stored in the device, reagents commonly referred to as primers for performing PCR reaction, fluorescent reagents for labeling the DNA fragments and the like are used. In general, as the device for storing biochemical reagent, in reagents stored within the device and provided to the user, expensive reagents such as primers or fluorescent reagents in the sample preparation of the DNA analysis are often required. Therefore, in the current sample preparation of the biochemical analysis that does not use a device in which reagents are stored, since such expensive reagents are manually treated by skilled person using a micropipette or the like, it was possible to suppress the amount of use to the required minimum amount of use.

In contrast, when the sample preparation of biochemical analysis that is manually performed is automated using the device for storing biochemical reagents, in a device manufacturer, how to store the expensive reagents in a disposable device without a significant increase from the required minimum use amount, and how to drip reagents more than the minimum of the required amount from the device in use become significant issues.

Further, in the aforementioned object, the term 'inexpensive' mentioned in iii) represents that it is possible to select a device material for inexpensively manufacturing the device for storing biochemical reagent, and it is possible to communalize the device structure, regardless of difference in the types of the reagents stored in the device.

In regard to the selection of device materials, when viewed from a device structure surface that stores the reagents inside by providing a well on the device, which is often considered in the micro fluidic device, in this structure, there are many specifications required for the resin material constituting the device body as one of the device components. Therefore, in the selection of the device materials, there was a need to select the device materials, based on the conditions that it is possible to achieve the shape of the device body to be complicated, the material has rigidity enough to allow the user to handle the device as consumables, and the material has a low water vapor permeability so that the reagents stored in the device are not evaporated or absorbed during a warranty period (for example, three months, six months, one year or the like) of the device manufacturer until reaching the user. Therefore, for example, in resin such as polypropylene (PP) resin that has low water vapor permeability, is inexpensive and is easily molded, there is a problem that rigidity is low and it difficult to achieve a complicated shape. Therefore, although there is no choice but to select resin such as cyclo olefin polymer (COP) resin that has low water vapor permeability and has high rigidity, such a resin is relatively difficult to mold and is also expensive as a material. After all, the structure that stores the reagents inside by providing a well on the device, it is not possible to avoid the problem of difficulty in the material selection of the device body, which tends to be expensive.

Further, although there is also an experimental device of a type in which a pouch capable of storing only a single type of reagent is attached to the device, and the reagent stored in the pouch is pushed by finger at the time of analysis use of the user, only a single type of reagent may be stored in a single pouch, and it is not possible to store the several types of reagents. Accordingly, such a device cannot be used in the analysis that requires a plurality of types of reagents. Also, when a plurality of pouches is attached to the device for the analysis requiring a plurality of types of reagents, since there is a need to newly attach the number of pouches according to the types of reagents needed for each type of analysis each time, there is a problem of tendency of expensiveness.

Therefore, an object of the present invention is to provide the device for storing biochemical reagent and the biochemical analyzer described in the aforementioned objects i) to iii), while paying attention to the aforementioned specific issues.

Solution to Problem

To achieve the above-mentioned problem, the device for storing biochemical reagent according to the present invention is a device for storing biochemical reagent capable of being supplied to a user as a consumable device, by joining the device body and a reagent storage container in which the reagent is enclosed in the enclosed space in a state of being shut off from the outside air.

Therefore, in the device for storing biochemical reagent according to the present invention, first, reagent is hermetically packaged, using the reagent storage container configured so that the reagent in the enclosed space is sealed by the joint that forms a joining surface with the device body, and the enclosed space and the joint are integrated.

Further, the interior of the device body is also sealed, by joining the joining surface with the device body at the joint which seals the enclosed space in the reagent storage container, to the cartridge surface of the device body.

At that time, in the device body the interior of which is sealed by the reagent storage container, a reagent enclosing room (hereinafter, referred to as a well), a sample enclosing well, and a concave well for performing the reaction and purification are formed.

Also, in the device for storing biochemical reagent according to the present invention, different types of reagents are enclosed in each of a plurality of enclosed spaces, a plurality of types of reagent storage containers that integrally seals the openings of the plurality of enclosed spaces by a joint are prepared in accordance with a difference in patterns of each of the different types of reagents enclosed in the plurality of enclosed spaces. Thus, even when the design and manufacturing of the device body are communalized, the device for storing biochemical reagent can be used in a plurality of types of analytical applications.

Meanwhile, the biochemical analyzer according to the present invention, the device body for performing the biochemical analysis using such a device for storing biochemical reagent is equipped with a holder for setting the device for storing biochemical reagent, and a lid that presses the reagent storage container which is set by mounting the device body on the holder to the holder side.

At that time, since the enclosed space of the reagent storage container is compressed by pressing the lid, and the sealed portion of the joint which seals the opening of the compressed enclosed space is deformed to bulge into the device body and is ruptured (broken), the reagent stored within the reagent storage container is dripped into the device body.

This specification includes the contents as disclosed in the specification and/or drawings of Japanese Patent Application No. 2014-117089 which is the basis of the priority of the present application.

Advantageous Effects of Invention

According to the device for storing biochemical reagent and the biochemical analyzer according to the present invention, the following effects can be obtained.

I) It is possible to provide a device for storing biochemical reagent that hermetically stores the reagent, and can drip the reagent without being exposed to the outside air from the storage place, and a biochemical analyzer using the device.

In the device for storing biochemical reagent according to the present invention, the reagent storage container is formed in which the reagent in the enclosed space is sealed by the joint that forms the joining surface with the device body, and the enclosed space and the joint are integrated, and a device is provided which is sealed to the outside air by joining the joining surface with the device body formed at the joint in the reagent storage container to the cartridge surface of the device body. Thus, the interior of the cartridge of the device body including the well in which the reagent is dripped also serves as a space that is shut off from the outside air.

That is, in the device for storing biochemical reagent, the interior of the reagent storage container which stores the reagent, and the interior of the cartridge of the device body to which the reagent is dripped are also sealed together to the outside air. Thus, when using the device, it is possible to move the reagent into the cartridge interior of the device body from the reagent storage container, without being exposed to the outside air, and it is possible to prevent contamination, without impairing the function of the reagent.

II) It is possible to provide a device for storing biochemical reagent capable of storing or dripping the small amount of reagent, and a biochemical analyzer using the device.

The enclosed space of the reagent storage container is generally manufactured by molding, by determining a magnitude of the enclosed space in advance to conform to the amount of reagent to be enclosed, and by manufacturing a molding die. However, in view of the manufacturing techniques, it is also possible to manufacture a smaller size of enclosed space. Further, even if the small amount of reagent is applied to the reagent storage container, since the enclosed space which stores the reagent is sealed by the joint which forms the joining surface with the device body, it is possible to fully cope with this case, by dispensing techniques, such as a current nozzle or a piezo type inkjet.

Further, although many types of forms such as liquid, granular and powder are conceivable as the reagent, since the reagent storage container is structurally simple packaging form which seals the enclosed space by the joint, any type of reagent may be hermetically stored. Further, in regard to the functions such as low water vapor permeability and light-shielding of the device body that are difficult to be obtained in resin, as long as the enclosed space and the joint constitute the reagent storage container, it is possible to select the widely existing materials, such as an aluminum sheet or a resin sheet subjected to fluorine coating, as needed.

Therefore, if the amount of reagent is very small, the form of the enclosed space of the reagent storage container can be made accordingly, and by selecting the material suitable for the enclosed space and the joint, until the device is used, the small amount of reagent can be stored without contamination of the water vapor or the like contained in the outside air.

III) It is possible to provide an inexpensive device.

In general, the time from dripping of reagent to disposal of the device is considerably shorter than the time from enclosing the reagent by the device provider (device manufacturer) at the time of shipment to the use of the user.

Thus, in the device for storing biochemical reagent according to the present invention, the reagent of the enclosed space is sealed by the joint which forms the joining surface with the device body, and the storage of the reagent is performed in the interior of the reagent storage container in which the enclosed space and the joint are integrated. When comparing this to a method of storing the reagent in the cartridge of the device body without including the reagent storage container, since there is an advantage that it is not necessary to select a material having low water vapor permeability as the material of the cartridge, it is possible to select an inexpensive resin having high water vapor permeability, such as PC (polycarbonate) resin, acrylic resin, and an elastomer.

Additionally, the reagent storage container can also be configured as a reagent storage container which has a plurality of enclosed spaces by integrally sealing the openings of the plurality of enclosed spaces using a single joint, and it is possible to enclose separate reagents in each enclosed space at the time of enclosing the reagent. This has an advantage that the packaging cost of the reagent is lower than a pouch type method of storing the reagent which needs to prepare the pouches as much as the type of the reagents.

Furthermore, by changing the types of the reagents enclosed to each of the plurality of enclosed spaces of the reagent storage container, and the individual enclosed spaces as the enclosing destination, there is also an advantage that is capable of providing the device for storing biochemical reagents of the plurality of patterns, without changing the design and manufacturing process of the device body. Of course, although it is necessary to devise the well position formed in the device body or a way of moving the reagents in the device body after being dripped into the well in advance, since manufacturing costs of the molding die of the device body or the molding die of the enclosed space of the reagent storage container are high, it is possible to provide the devices of the plurality of patterns without changing the molding dies, and finally, it is possible to provide the device for storing biochemical reagent to the user, while lowering the cost.

Issues, configurations and effects other than those described above will become apparent from the following description of embodiments.

DESCRIPTION OF EMBODIMENTS

Figure 1:
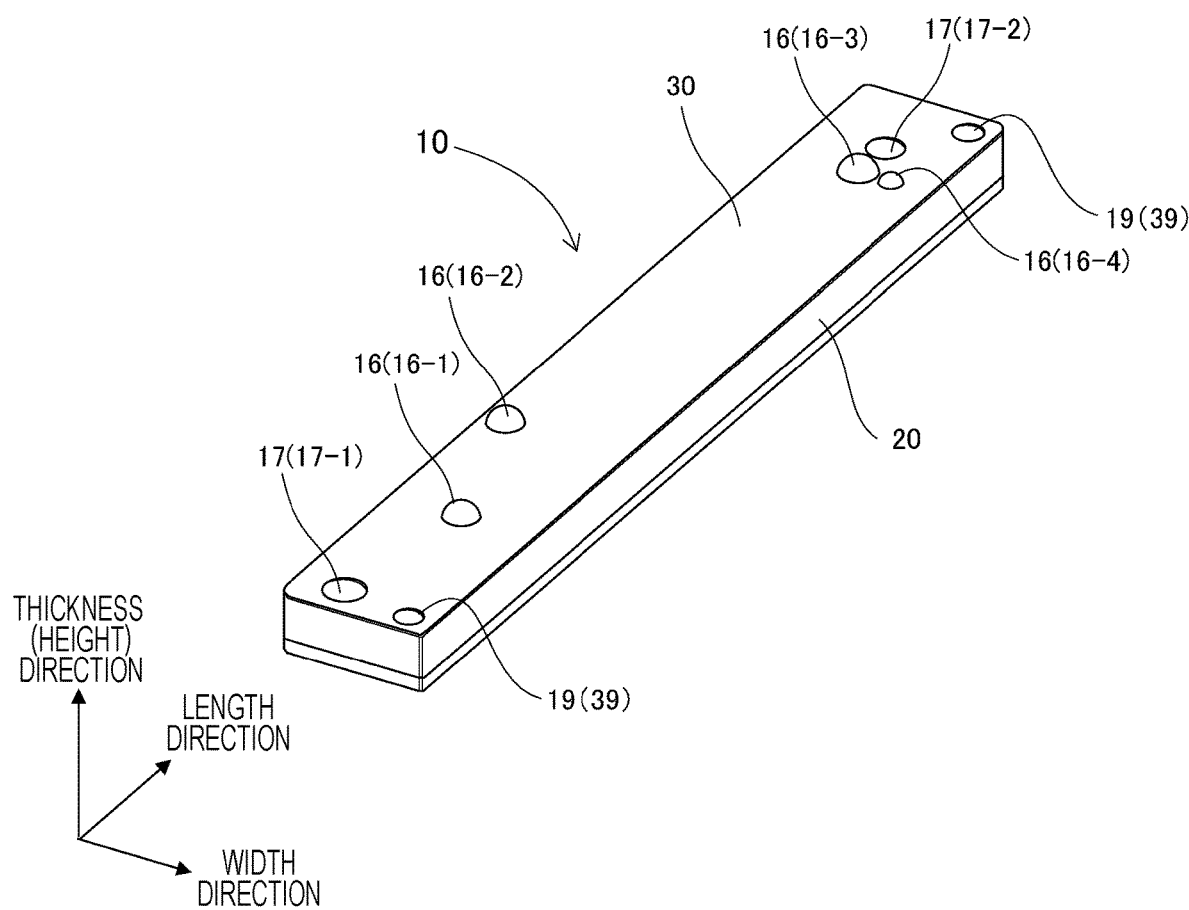
FIG. 1 is an overall perspective view of a device for storing reagent for STR analysis as an embodiment of a device for storing biochemical reagent according to the present invention.

Hereinafter, embodiments of a device for storing biochemical reagent and a biochemical analyzer according to the present invention will be described with reference to the drawings.

In the description, based on a sample preparation of a STR analysis as an example of a biochemical analysis, a device for storing reagent for STR analysis as consumables capable of storing reagent used in the STR analysis process will be described as an embodiment of the device for storing biochemical reagent according to the present invention, and a liquid sending temperature control system using the device for storing reagent for STR analysis will be described as an embodiment of the biochemical analyzer. However, as long as the device for storing biochemical reagent and the biochemical analyzer according to the present invention have features such as configurations and functions to be described below, it goes without saying that they are also applicable to a device for storing biochemical reagent and a biochemical analyzer used in the biochemical analysis other than the STR analysis.

Therefore, in regard to the device for storing reagent for STR analysis as an embodiment of the device for storing biochemical reagent according to the present invention, and the liquid sending temperature control system as an embodiment of the biochemical analyzer according to the present invention, before describing the respective specific aspects, first, features such as configurations and functions of the device for storing biochemical reagent and the biochemical analyzer according to an embodiment of the present invention will be described.

The device for storing biochemical reagent according to the present embodiment is a device for storing biochemical reagent that is configured by sticking a reagent storage container which is shut off from the outside air and has a packaging form utilizing sealed press through pack (PTP) packaging to the device body, and can be provided as a consumable device to the user.

That is, in the device for storing biochemical reagent according to the present embodiment, the reagent container is made up of the PTP packaging sheet that is configured such that, by sticking a top sheet to a base sheet formed with a pocket having a hollow convex shape in which reagent can be contained, the pocket opening of the base sheet in which the reagent is contained in advance is sealed with the top sheet.

In this case, the PTP packaging sheet has a unique sealed packing storage form for the storage of reagent in which, until the user uses the tablet, the tablet is hermetically packaged in the pocket having the hollow convex shape formed on the base sheet, and in the use of the tablet, by pushing the convex portion of the pocket of the base sheet with the tablet hermetically stored inside from the base sheet side to the top sheet side with a finger, the packaging form is improved on the basis of the packing form of the tablet in which the tablet bursts through the film sheet making up the top sheet.

Further, in the device for storing biochemical reagent according to the present embodiment, by sticking the film sheet surface as the top sheet of the PTP packaging sheet in which the reagent is sealed and packed with the cartridge surface of the device body, the interior of the device body is also sealed. At that time, a reagent enclosing well, a sample enclosing well, and a concave well for performing the reaction, purification or the like are formed in the device resin body forming the device body.

Also, in the device for storing biochemical reagent according to the present embodiment, different types of reagents are enclosed in a plurality of pockets formed in the base sheet, a plurality of types of the PTP packaging sheets, in which openings of the plurality of pockets of the base sheet are integrally sealed with the film sheet as the top sheet, are prepared in accordance with a difference in the patterns of different types of reagents sealed in each of the plurality of pockets. Thus, even if the design and manufacturing of the device body are communalized, the device for storing biochemical reagent can be used in a plurality of types of analytical applications.

Meanwhile, the biochemical analyzer according to the present embodiment is equipped with a device body for performing biochemical analysis, a holder for setting the device for storing biochemical reagent, and a lid that presses the PTP packaging sheet of the device for storing biochemical reagent that is set by mounting the device body on the holder to the holder side.

Further, in the liquid sending temperature control system as the biochemical analyzer according to the present embodiment, the storage and dripping of reagent are performed in the following orders.

Step S1: The manufacturer operator applies (injects) and encloses the reagents to the PTP packaging sheet.

Step S2: The manufacturer operator manufactures the device body, produces a device for storing biochemical reagent by being stuck to the PTP packaging sheet, and provides the device to the user as a consumable device.

Step S3: The user sets the device to the holder of the liquid sending temperature control system as a biochemical analyzer (thereafter, the user applies the analyzed sample to the device as needed).

Step S4: The lid of the device covers the holder in which the device is set automatically or manually by the user.

Step S5: The pocket of the base sheet of PTP packaging sheet of the device is pushed by the lid of the device, the sealed portion of the top sheet that seals the pocket opening of the base sheet bulges to rupture (break) in the corresponding well of the device body, and the reagent stored in the internal pocket is dripped into the well of the device.

Step S6: The device starts the liquid sending and the temperature control by using the reagent.

Step S7: The sample subjected to the liquid-sending and temperature-control is conveyed to the analyzer automatically by the device or manually by the user, and the analysis is started.

With such a procedure, the reagent used in the liquid sending temperature control system as the biochemical analyzer is stored in the reagent storage container made up of the PTP packaging sheet, and by rupturing the PTP packaging sheet in the device body during use, the reagent can be dripped in the device body in the sealed space that is not exposed to the outside air, and it is possible to store and apply a small amount of reagent.

Moreover, according to the device for storing biochemical reagent and the biochemical analyzer according to the present embodiment, the following effects can be obtained.

I) It is possible to provide a device for storing biochemical reagent that hermetically stores the reagent and can drip the reagent without being exposed to the outside air from the storage location, and a biochemical analyzer using this device.

In the device for storing biochemical reagent according to the present embodiment, since the sheet of the PTP packaging sheet enclosing the reagent is stuck to the cartridge of the device body to provide the sealed device, the interior of the cartridge including the well to which the reagent is dripped also becomes a space that is shut off from the outside air.

That is, in the device for storing biochemical reagent, the PTP packaging sheet portion in which the reagent is stored, and the well portion of the cartridge of the device body in which the reagent is dripped are also sealed. Accordingly, the reagents can be moved without being exposed to the outside air, and it is possible to prevent contamination without impairing the function of the reagent.

II) It is possible to provide a device for storing biochemical reagent capable of storing and dripping a small amount of reagent, and a biochemical analyzer using this device.

Although the base sheet of the PTP packaging sheet is manufactured by being generally molded, the dimension of the pocket is previously determined in accordance with the amount of reagent to be enclosed, and a molding die is manufactured. The application of the PTP packaging sheet is widely known as a packing material of the tablet, and the dimension of the pocket is also made according to the dimension of the tablet that is easily taken by a human. However, in view of the manufacturing techniques, it is also possible to manufacture a smaller dimension of the pocket. As a result, even if the small amount of reagent is applied to the PTP packaging sheet, it is possible to fully cope with this case, by dispensing techniques, such as a current nozzle or a piezo type inkjet.

Further, although many types of forms such as liquid, granular and powder are conceivable as the reagent, since the PTP packaging sheet is structurally simple packaging form, any type of reagent may be hermetically stored. Further, in regard to the functions such as low water vapor permeability and light-shielding of the device body that are difficult to be obtained in resin, in the PTP packaging sheet material, it is easy to select the widely existing materials, such as an aluminum sheet or a resin sheet subjected to fluorine coating, as needed.

Therefore, if the amount of reagent is a small amount, a type of pocket of the PTP packaging sheet can be made accordingly, and if the appropriate material is selected, the small amount of reagent can be stored.

III) It is possible to provide an inexpensive device.

In general, the time from dripping of reagent to disposal of the device is considerably shorter than the time from enclosing the reagent by the device provider (device manufacturer) at the time of shipment to the use of the user.

Thus, in the device for storing biochemical reagent according to the present invention, the storage of the reagent is performed in the interior of the PTP packaging sheet. When comparing the method with a method of storing the reagent in the cartridge of the device body, since there is an advantage that it is not necessary to select a material having low water vapor permeability as the material of the cartridge, it is possible to select an inexpensive resin having high water vapor permeability, such as PC (polycarbonate) resin, acrylic resin, and an elastomer.

Further, the PTP packaging sheet easily obtains a form in which multiple reagents are packed on a single sheet so as to be widely used as a packaging material for the tablet. By applying this, first, it is possible to provide a plurality of pockets in a single PTP packaging sheet, and it is possible to enclose separate reagents in each pocket at the time of enclosing the reagents. This has an advantage that the packaging cost of the reagent is lower than a pouch type method of storing the reagent which needs to prepare the pouches as much as the type of the reagents.

Furthermore, there is also an advantage capable of providing the device of the plurality of patterns, by changing the types, the positions or the like of the reagents enclosed to the PTP packaging sheet, without changing the design and manufacturing process of the device body. Of course, although it is necessary to devise the well position of the device body or a way of moving the reagents after being dripped in advance, since the manufacturing costs of the molding die of the device resin body or the molding die of the PTP packaging sheet are expensive, it is possible to provide the device of the plurality of patterns without changing the molding dies, and finally, it is possible to provide the device to the user by lowing the cost.

Hereinafter, the device for storing reagent for STR analysis as an embodiment of the device for storing biochemical reagents according to the present invention including features such as the configurations and functions, and the liquid sending temperature control system as an embodiment of the biochemical analyzer according to the present invention will be described based on the respective specific embodiments thereof.

FIG. 1 is an overall perspective view of a device for storing reagent for STR analysis as an embodiment of the device for storing biochemical reagent according to the present invention.

Figure 2:
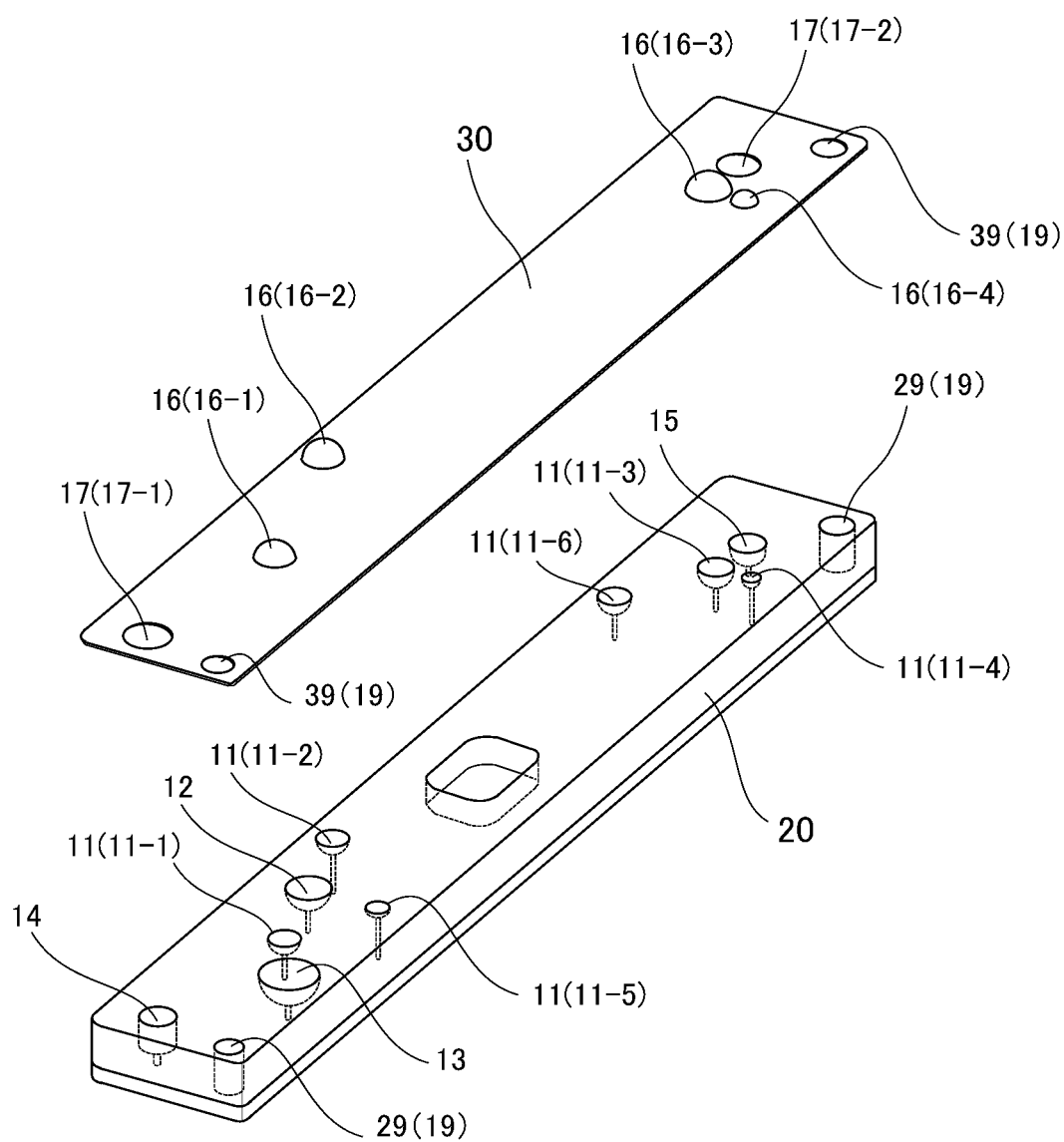
FIG. 2 is an exploded structural view of the device illustrated in FIG. 1.

FIG. 2 is an exploded structural view of the device illustrated in FIG. 1.

A device 10 for storing reagent for STR analysis (hereinafter, simply referred to as a device) is configured by sticking a device body 20 and a PTP packaging sheet 30. In the illustrated example, the device 10 has a thin elongated, substantially rectangular parallelepiped shape, and has a shape in which a bottom surface of the PTP packaging sheet 30 and a top surface of the device body 20 having similar planar shape are joined to each other in its thickness direction.

The device body 20 is provided with structures such as, a reagent dripping well 11 (in the illustrated example, six reagent dripping wells 11-1 to 11-6), an agitating well 12, a waste liquid well 13, a sample enclosing well 14, a detection well 15, and a positioning through-hole 29. Each of the wells 11, 12, 13, 14 and 15 is made up of, for example, a bowl-shaped concave portion of appropriate size that is formed on the top surface of the device body 20 corresponding to the joining surface with the PTP packaging sheet 30. A plurality of positioning through-holes 29 is provided in the corner portions of the joining surface to be spaced part from each other, and penetrates the device body 20 in the thickness direction.

The PTP packaging sheet 30 is provided with a single or a plurality of pockets 16 of convex shape (in the illustrated example, four pockets 16-1 to 16-4 corresponding to each of the four reagent dripping wells 11-1 to 11-4), and positioning through-holes 39, and as needed, through-holes 17 for injection of the sample or the like or for extraction of the reaction and purification results are provided. The reagent is contained inside the pocket 16, and when a flat bottom surface of an opposite side to the side from which the pocket 16 of the PTP packaging sheet 30 protrudes is stuck and joined to the top surface of the device body 20, the pockets 16 (16-1 to 16-4 in the illustrated example) are disposed on the top surface of the PTP packaging sheet 30 so as to be located to face the corresponding reagent dripping wells 11 (11-1 to 11-4 in the illustrated example). Meanwhile, in the illustrated example, the through-holes 17 are disposed on the top surface of the PTP packaging sheet 30 such that each through-hole 17 (two through-holes 17-1 and 17-2 in the illustrated example) is located to face each of the sample enclosing well 14 and the detection well 15 of the device body 20.

Further, positioning through-holes 39 are provided on the top surface of the PTP packaging sheet 30 to face the positioning through-holes 29 of the device body 20. The positioning through-holes 29 and the positioning through-holes 39 form the positioning through-holes 19 of the device 10 that penetrate the device 10 in the thickness direction.

Figure 3:
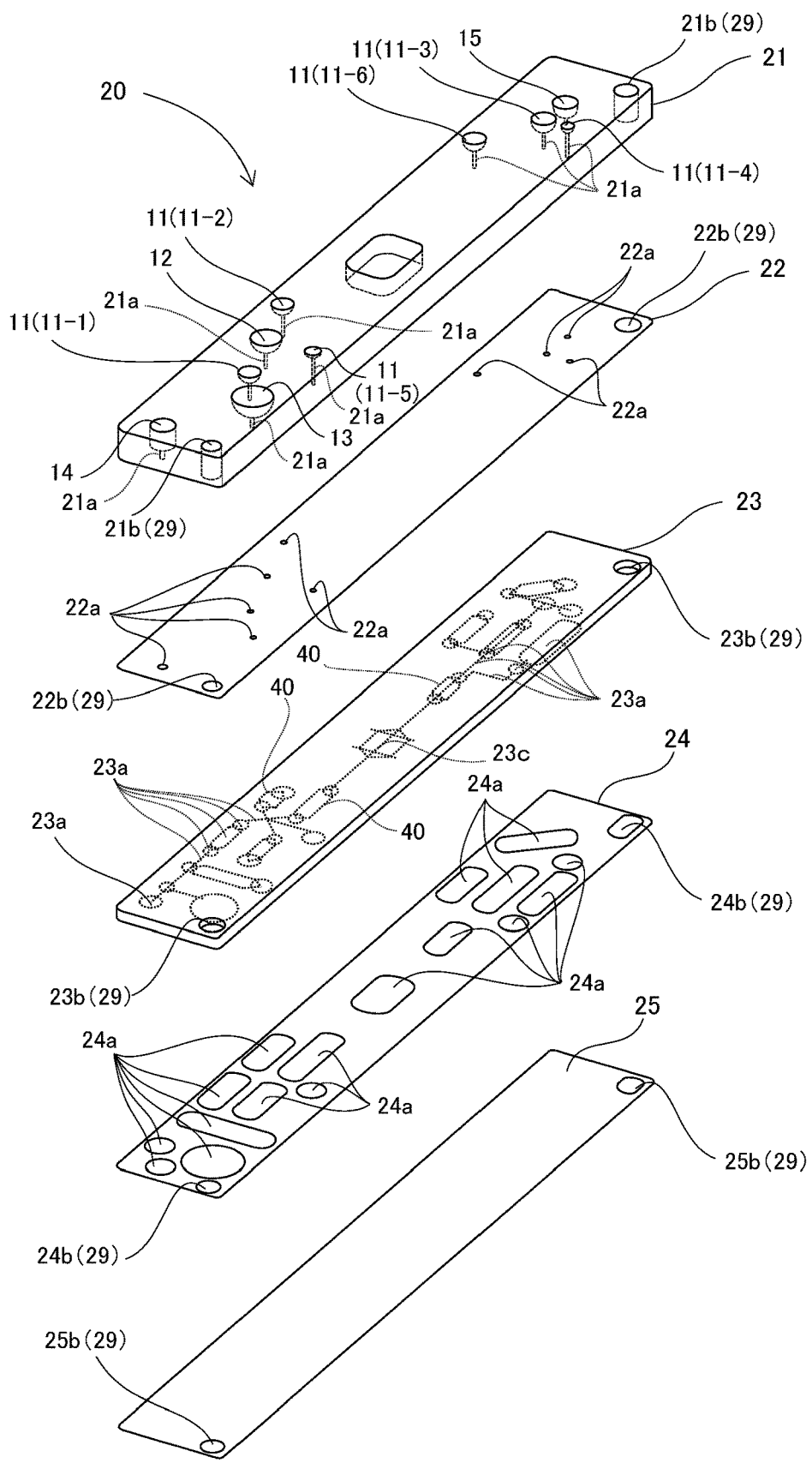
FIG. 3 is an exploded structural view of the device body illustrated in FIG. 2.

FIG. 3 is an exploded structural view of a device body illustrated in FIG. 2.

The device body 20 is configured by sticking a device resin body upper part 21 and a device resin body lower part 23 with a resin body sticking sheet 22, and by sticking the device resin body lower part 23 and a membrane 25 with a membrane sticking sheet 24.

Each of the wells 11, 12, 13, 14 and 15 is formed on the top surface of the device resin body upper part 21, and one end side of each well passage 21a is opened to the deepest bottom portion of the respective wells 11, 12, 13, 14 and 15. The well passage 21a extends along the thickness direction of the device resin body upper part 21, and other end side thereof is opened as a well outlet on the bottom surface of the device resin body upper part 21. Further, a positioning through-bore 21b which forms the positioning through-hole 29 is also formed in the device resin body upper part 21. The shape of the inner peripheral surfaces of the respective wells 11, 12, 13, 14 and 15 is a shape in which the reagents are hard to retain, for example, the bottom surface is inclined toward the opening of the well passage 21a, such that it is possible to send the reagents and the like stored in the well from the wells via the well passage 21a without waste.

Sheet communication holes 22a passing through in the thickness direction are formed in the resin body sticking sheet 22 to correspond to each well outlet of each well passage 21a that is opened to the bottom surface of the device resin body upper part 21. Further, positioning through-bores 22b which form the positioning through-holes 29 are also formed in the resin body sticking sheet 22.

On the top surface of the device resin body lower part 23, a groove-like channel extending along its plane direction, and an upper opening of the through-channel extending along the thickness direction are appropriately formed. Similarly, on the bottom surface of the device resin body lower part 23, a groove-like channel extending along the plane direction, and a lower opening of the through-channel extending along the thickness direction are appropriately formed. Among them, the upper opening of a predetermined plurality of through-channels is disposed to face one of the sheet communication holes 22a formed in the resin body sticking sheet 22 on the top surface of the device resin body lower part 23, and can be made to communicate with the corresponding well passage 21a in the wells 11, 12, 13, 14 and 15. Further, the groove-like channels provided on the top surface or the bottom surface of the device resin body lower part 23 extend to allow the upper openings or the lower openings of the predetermined through-channels to communicate with each other, on the top surface or the bottom surface of the device resin body lower part 23. In the illustrated example, among the groove-like channels formed on the bottom surface of the device resin body lower part 23, a groove-like channel portion, of the bottom surface central portion, corresponding to a temperature control aluminum block 81 of the liquid sending temperature control system 60 to be described later serves as a temperature-controlled section 23c.

Thus, on the top surface of the device resin body lower part 23, the through-channel in which the upper opening is disposed to face the sheet communication hole 22a is configured so that the feeding of the reagent is accepted between the sheet communication hole 22a and one of the wells 11, 12, 13, 14 and 15 with which the sheet communication hole 22a communicates.

The wells 11, 12, 13, 14 and 15 formed in the device resin body upper part 21 have a device configuration in which the wells and the temperature-controlled section 23c are connected as illustrated in drawings by these groove-like channels and the through-channels formed in the device resin body lower part 23.

At that time, the upper openings of the groove-like channels and the through-channels formed on the top surface of the device resin body lower part 23 are covered with the sheet surface of the resin body sticking sheet 22, in the state of sticking the device resin body upper part 21 and the device resin body lower part 23 with the resin body sticking sheet 22, with the exception of the upper opening of the predetermined groove-like channel that communicates with the sheet communication hole 22a of the bottom surface of the resin body sticking sheet 22.

In contrast, among the lower openings of the groove-like channels and the through-channels formed on the bottom surface of the device resin body lower part 23, the lower openings of the predetermined groove-like channels and the predetermined through-channels can be made to directly face the membrane 25 via sheet openings 24a formed in a membrane sticking sheet 24 to be described below. Therefore, in the state of sticking the device resin body lower part 23 and the membrane 25 via the membrane sticking sheet 24, the lower openings of the groove-like channels and the through-channels formed on the bottom surface of the device resin body lower part 23 are configured so that a portion capable of directly facing the membrane 25 via the sheet opening 24a of the membrane sticking sheet 24 is covered with the sheet surface of the membrane 25, and meanwhile, a portion incapable of directly facing the membrane 25 is covered with the sheet surface of the membrane sticking sheet 24.

In FIG. 3, the groove-like channels and the through-channels formed in the device resin body lower part 23 are expressed in dotted lines in the drawing, and are referred to as device channels 23a. Further, the device resin body lower part 23 is also formed with positioning through-bores 23b that form positioning through-holes 29. In this way, rather than providing an internal channel extending along the top surface or the bottom surface in the interior of the device resin body lower part 23, since the device channels 23a are formed by the combination of the groove-like channels extending along the top surface or the bottom surface and the through-channels extending in the thickness direction thereof, machining of the device channels 23*a* is also facilitated.

A plurality of sheet openings 24*a* is formed in the membrane sticking sheet 24, so as to allow predetermined portions of the device channels 23*a* formed on the bottom surface of the device resin body lower part 23, including the lower openings of the predetermined groove-like channels or the predetermined through-channels formed on the bottom surface of the device resin body lower part 23, to directly face the membrane 25. Thus, the predetermined portions in the device channels 23*a* of the bottom surface of the device resin body lower part 23 directly covered with the membrane 25 constitute a flow rate control section 40 (see FIGS. 10[I] and 10[II]) that allows control of inflow (liquid feeding) and outflow (liquid sending) of the reagent via the sheet opening 24*a*, in corporation with a holder channel 74 (see FIG. 6) to be described later.

Further, the membrane sticking sheet 24 is also formed with positioning through-bores 24*b* that form the positioning through-holes 29.

The membrane 25 is formed of a flexible member having resiliency, and covers the groove opening or the end opening of the device channels 23*a* formed on the bottom surface of the device resin body lower part 23 by interposing the membrane sticking sheet 24 indirectly or directly by the membrane 25 itself, thereby isolating the device channel 23*a* of the device resin body lower part 23 from the ambient atmosphere (outside air) of the device 10.

Furthermore, positioning through-bores 25*b* that form positioning through-holes 29 are formed in the membrane 25.

As the function, enclosing, storage and dripping of the reagent are performed using the aforementioned PTP packaging sheet 30 as a medium, but the movement (liquid feeding or liquid sending), agitation, the temperature control or the like of the reagent is performed using the device body 20 as a medium. Therefore, wells 12 and 15 serving as various reaction layers are provided in the device resin body upper part 21, and the device channels 23*a* connecting the wells 11, 12, 13, 14 and 15 are provided in the device resin body lower part 23. The membrane 25 serves as a driving medium, and the movement of the reagent or the like is performed, using the air pressure of the liquid sending temperature control system 60 to be described later as a drive source.

As each material, the device resin body upper part 21 and the device resin body lower part 23 are desirably manufactured by molding, for example, using an inexpensive resin which has high water vapor permeability, has a heat resistance to withstand the temperature control reaction required for analysis, has rigidity enough to be easily treated by the user as a device or easily produces complex shapes. As an example, PC resins, acrylic resins, elastomers and the like are adopted, but are not limited thereto depending on the purpose.

Since the membrane 25 is used as a driving medium of liquid feeding of the reagent or the like in this embodiment, the reagent or the like is not directly exposed to the membrane during the liquid sending and the temperature control. Therefore, an easily deflectable material with resiliency is desirable, and various rubbers such as ethylene propylene diene monomer (EPDM) rubber and silicone rubber, and elastomer sheets may be adopted as an example. For the purpose of analysis for performing the temperature control, a material having high heat transfer rate is desired. Thus, a thin material having thickness of 0.1 mm to 1 mm is desired in view of such circumstances.

As the resin body sticking sheet 22 and the membrane sticking sheet 24, a double-sided tape, a thermal welding tape and the like are adopted as an example. As long as a method of fully having the sticking force after providing the sheet communication holes 22*a*, the sheet openings 24*a* and the through-bores 22*b* and 24*b* so as not to impair the function of the wells 11 to 15 and device channel 23*a*, the device body 20 can also be manufactured using a method of not using the sheet materials 22 and 24 such as an adhesive or thermocompression, without being limited thereto.

Figure 4:
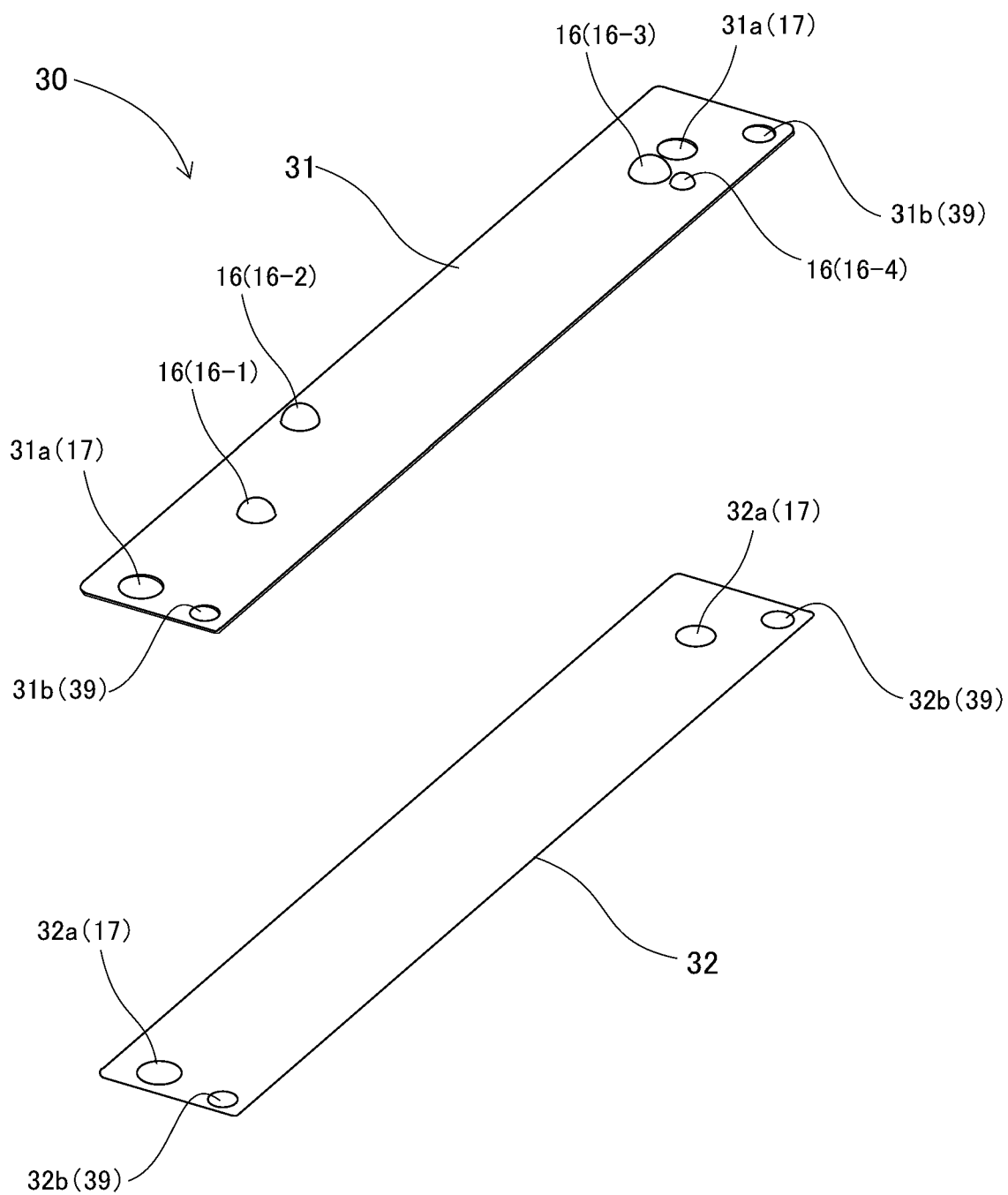
FIG. 4 is an exploded structural view of a PTP packaging sheet illustrated in FIG. 2.

FIG. 4 is an exploded diagram of the PTP packaging sheet illustrated in FIG. 2.

The PTP packaging sheet 30 is divided into a base sheet 31 having a convex pocket 16 which encloses and stores the reagent, and a top sheet 32 that covers the opening of the pocket 16. Depending on the needs of the use the device, through-bores 31*a* and 32*a* that form the through-hole 17 for the injection of the sample or the like or for the extraction of the reaction and purification result, and positioning through-bores 31*b* and 32*b* that form the positioning through-holes 39 are also formed.

As the material of the base sheet 31 and the top sheet 32, it is important to select materials that are suitable for the storage of the reagent to be used. When the STR analysis is provided as an example, since the reagent is influenced by evaporation and water absorption due to the water vapor permeability, the light-shielding, the oxidation, the pH change, the contamination of DNA and RNA from the outside air and the like, materials other than these are desirable. Specifically, examples of the base sheet 31 include a single layer film or a multilayer film, such as a PVC (polyvinyl chloride) sheet, a PP (polypropylene) sheet, a PVdC (polyvinylidene chloride) sheet, a COC (Cycloolefin Copolymer) multilayer sheet, a PCTFE (Poly Chloro Tri Furuoro Ethylene) laminate, an aluminum sheet and a CFF sheet. Although the water vapor permeability and the sealability vary even depending on the thickness, the thickness is mostly within the range of 15 um to 500 um. Since a material that is further easily torn, while satisfying the aforementioned conditions, is added and used as the top sheet 32, the metal sheet such as an aluminum sheet is one of the most easily used example.

The two sheets 31 and 32 are divided until the reagent is enclosed, after changing the direction of the base sheet 31 by turning the posture of the base sheet 31 illustrated in FIG. 4 upside down such that the convex shape of the pocket 16 faces downward and the flat surface including the opening of the pocket 16 faces upward, the reagent is enclosed in the pocket 16, and the top sheet 32 is stuck to the flat surface including the opening of the pocket 16. Sticking may be performed by any method as long as it is suitable for storage of the reagent, and thermal welding or adhesive, adhesive tape or the like is adopted as an example. Thus, the interior of the pocket 16 of the PTP packaging sheet 30, and the reagent or the like enclosed within the pocket 16 are isolated from the ambient atmosphere (the outside air) of the device 10.

As illustrated in FIG. 2, by sticking the device body 20 to the PTP packaging sheet 30, the reagent or the like in the pocket 16 is provided to the user by being sealed. Specifically, the device resin body upper part 21 constituting the device body 20 illustrated in FIG. 3 is stuck to the top sheet 32 of the PTP packaging sheet 30 illustrated in FIG. 4. As the sticking means, any method may be used as long as sealing is kept, and it is possible to use crimping or welding using heat or laser, molecular sticking or the like using the surface modification or the like, other than the adhesive tape or adhesive.

Figure 5:
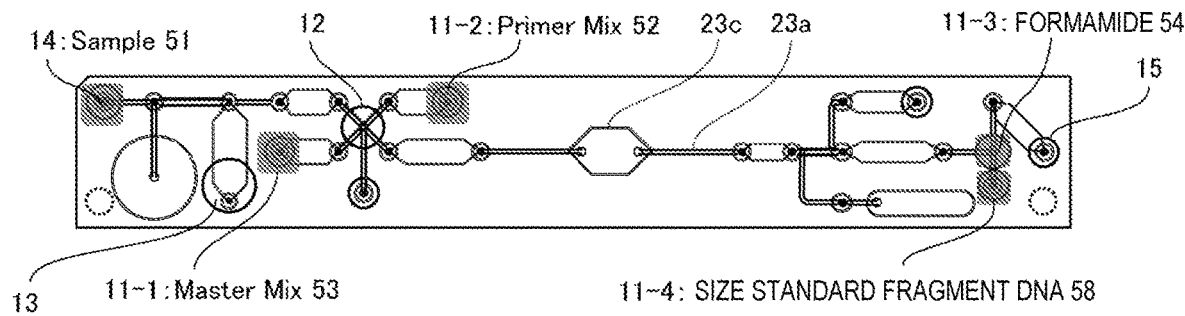
FIG. 5 is a diagram in which types are divided as an example of the STR analysis in the device manufactured in the configuration of FIGS. 1 to 4.
Figure 5:
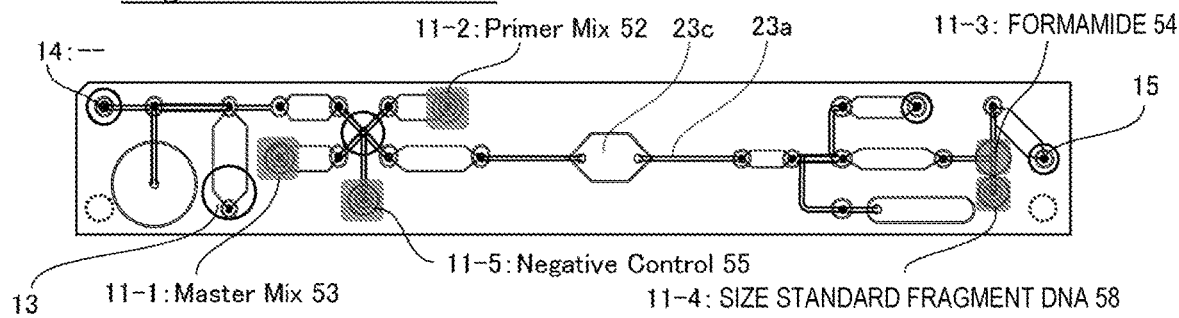
Figure 5:
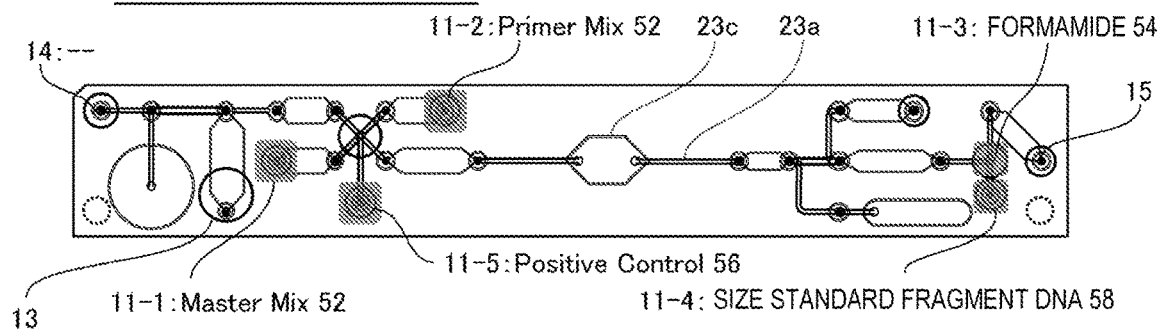
Figure 5:
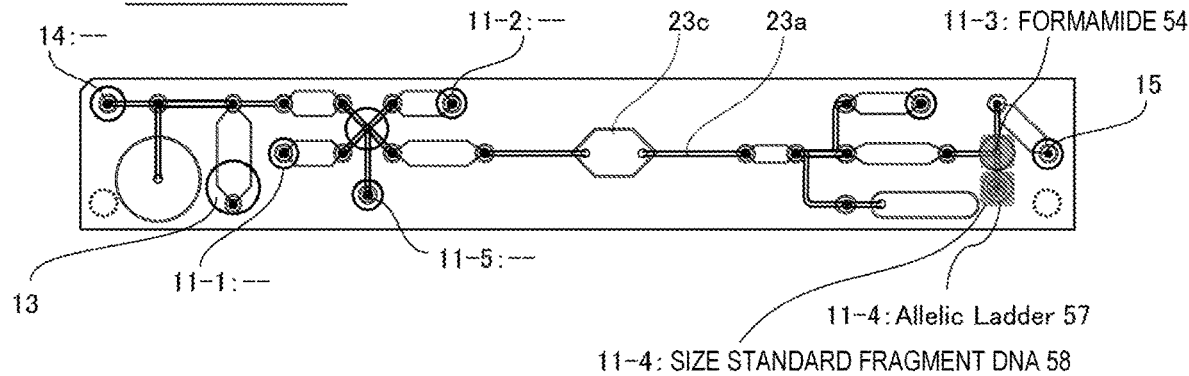

FIG. 5 illustrates a state in which the types of devices manufactured with the configuration of FIGS. 1 to 4 are divided as an example STR analysis.

FIG. 5 is a layout diagram obtained by projecting the device channel 23a and a holder channel 74 (see FIG. 6) to be described below, the reagent dripping well 11, the agitating well 12, the waste liquid well 13, the sample enclosing well 14, the detection well 15, and the position of the reagent necessary for the STR analysis (position of the pocket 16) with respect to the device 10, in order to illustrate the positions of the reagent or the like, and the functions and types of the devices, rather than illustrating the configuration or the structure.

In the STR analysis as one of analyses which the present embodiment aims for automation, when faithfully performing the conversion of analysis according to the manual work of the current status into the device, for example, the following four types of devices 10 are conceivable.

One device is a sample device A in which the sample 51 is put in the sample enclosing well 14, the primer mix 52 of the reagent dripping well 11-2 and the master mix 53 of the reagent dripping well 11-1 required for PCR reaction are mixed with each other, the DNA amplified via the PCR reaction in the temperature-controlled section 23c is quantified, and the DNA is put in the formamide 54 of the reagent dripping well 11-3 to obtain the reaction and purification results denatured into single strand (also performing the thermal denaturation if necessary). Another device is a negative control device B in which an existing negative control DNA 55 is put in and mixed with the reagent dripping well 11-5 instead of putting the sample 51 in the sample enclosing well 14, and the PCR reaction is performed in the temperature-controlled section 23c to check that the extra nucleic acid (DNA and RNA) is not contaminated in the PCR reaction system. Still another device is a positive control device C in which an existing positive control DNA 56 is put in and mixed with the reagent dripping well 11-5, instead of putting the sample 51 in the sample enclosing well 14, and the PCR reaction in the temperature-controlled section 23c is performed to check that the PCR reaction is correctly performed. Finally, the Still another device is a ladder device D which obtains the result of a mixture of allelic ladder 57 of the reagent dripping well 11-4 serving as an internal indicator of the analysis and the formamide 54 of the reagent dripping well 11-3, without obtaining the PCR reaction process.

As described above, in the four types of devices A, B, C and D, combinations of the necessary reagents are different from each other. For example, a primer mix 52 and a master mix 53 required for the PCR reaction are required in the three types of devices A to C but are not required in the ladder device D. Further, the allelic ladder 57 is essential in the ladder device D but it is not required in other three types of devices A to C. The formamide 54 is essential in all of the four types of devices A to D. The fragment DNA 58 for size standard is also required for all of the four types of devices A to D, but is mixed with and enclosed in the allelic ladder 57 in the ladder device D. The negative control DNA 55 and the positive control 56 are required for a single device B or C, but the mixing timing is the same. In the sample device 51, it is necessary to quantify the extracted DNA to be mixed with the primer mix 52 and the master mix 53.

Since specifications required for each of the devices A to D are different at first sight, it is necessary to prepare a plurality of types of the device bodies 20 that constitutes the device 10. However, in the present embodiment, since the PTP packaging sheet 30 is used as the reagent storage container, it is easy to treat a form in which a large number of reagents are packed on a single sheet as described above. By applying this example, by preparing the PTP packaging sheet 30 as illustrated in FIG. 4 in advance in which each of the plurality of required pockets 16 is provided in accordance with each type of devices A, B, C and D, selecting the corresponding base sheet 31 from the plurality of types of base sheets 31 having the different numbers and arrangements of the pockets 16 prepared for each type of devices A, B, C and D, in accordance with the devices A, B, C and D to be manufactured, enclosing separate reagents according to the types A to D of the devices to be manufactured in each pocket 16 of the selected base sheet 31 when enclosing the reagent, and sticking the PTP packaging sheet 30 as illustrated in FIG. 4 of the configuration sealed by the common top sheet 32 to the device body 20 of the same design as illustrated in FIG. 3 to manufacture the device 10, even when the design and manufacturing of the device body 20 are communalized, it is possible to provide four types of devices A to D.

Figure 6:
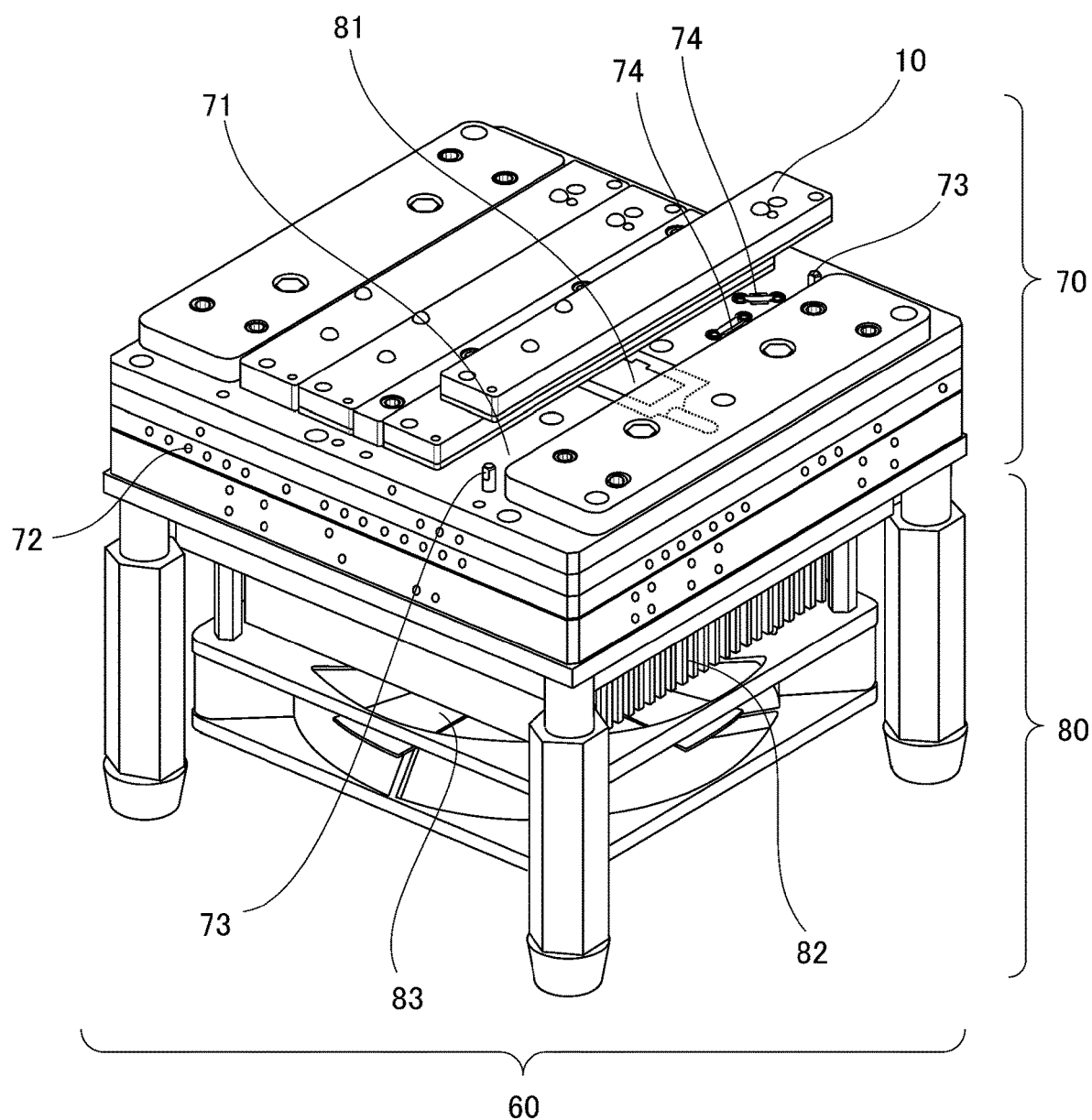
FIG. 6 is an overall view of a liquid sending temperature control system as an embodiment of the analyzer according to the present invention, and an assembling explanatory view of the device.

FIG. 6 is an overall view of the liquid sending temperature control system as an embodiment of the analyzer according to the present invention, and an assembling explanatory diagram of the device.

Figure 7:
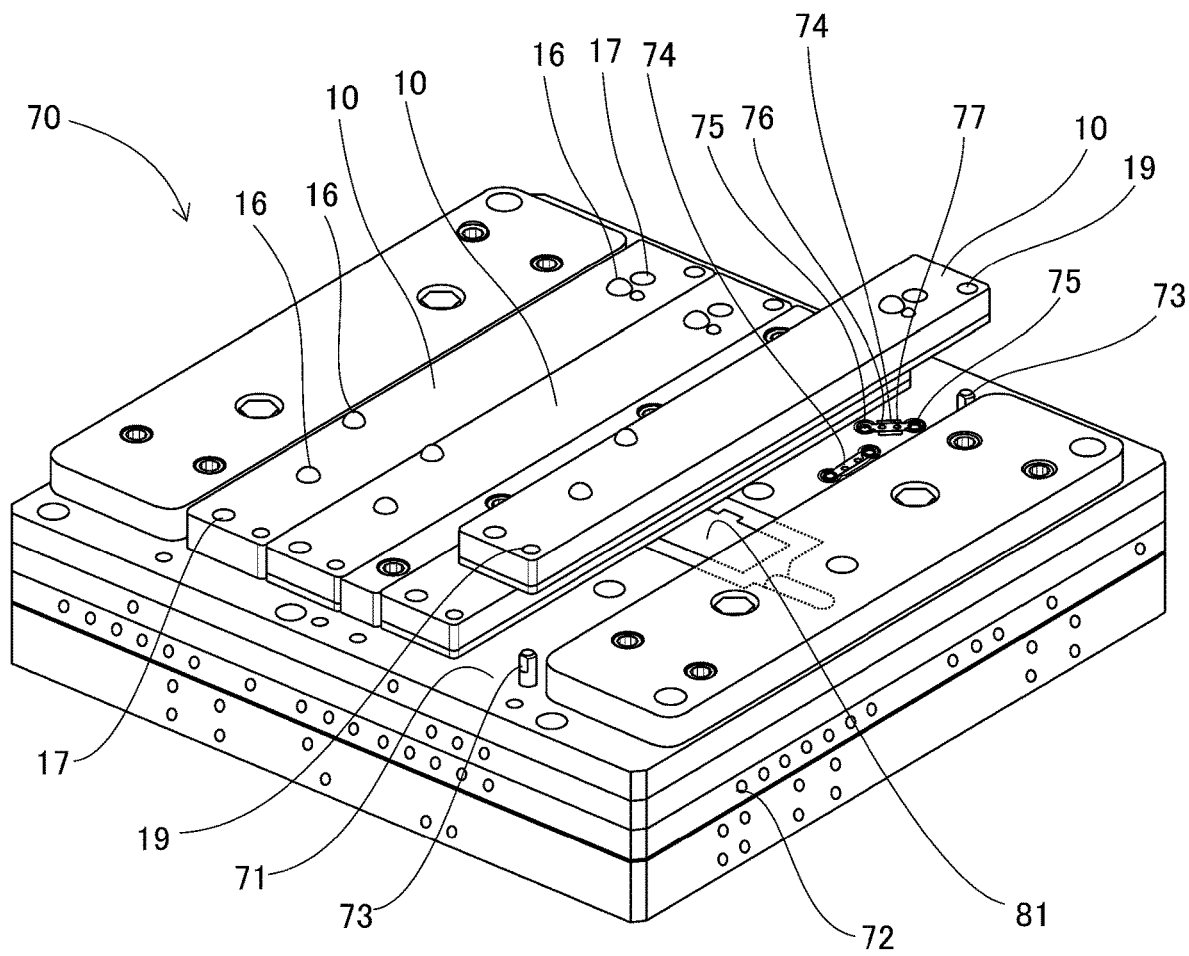
FIG. 7 is an enlarged view of a holder in the liquid sending temperature control system described in FIG. 6.

FIG. 7 is an enlarged view of the holder in the liquid sending temperature control system according to FIG. 6.

As illustrated in FIG. 6, a liquid sending temperature control system 60 is a biochemical device unit rather than consumables such as the device 10, and roughly includes a holder unit 70 on which the device 10 is mounted to perform the liquid sending control in the device 10, and a temperature control unit 80 that performs the temperature control of the device 10 mounted on the holder unit 70.

Among them, the holder unit 70 is equipped with a holder 71, a pneumatic pipe connector 72, a positioning pin 73 and the like. The holder 71 has a mounting surface on which the device 10 is mounted, while causing the membrane 25 of the bottom surface of the device body 20 to face the mounting surface, and groove-like holder channels 74 are formed on the mounting surface. The groove-like holder channels 74 are used, when moving the reagent between the predetermined device channels 23a, by causing the predetermined device channels 23a formed in the device body 20 to communicate with each other. The holder channels 74 are provided with advancing and retreating ports of the channel sealing pin 75 that protrude forward and backward from the mounting surface along the thickness direction of the device 10 when performing the communication/shutoff control between the predetermined device channels 23a formed in the device body 20, and openings (depressurization port and pressurization port) of each of the depressurization pipe 76 and the pressurization pipe 77 for depressurizing or pressurizing the interior of the holder channel 74 sealed by the membrane 25 of the bottom surface of the device body 20.

The pneumatic pipe connector 72 serves as a drive source of liquid sending or agitation of the reagent or the like in the device 10, allows air to enter and exit (suction and exhaust) the pneumatic actuator to allow the channel sealing pin 75 to protrude forward and backward from the mounting surface of the holder 71 along the thickness direction of the device 10, or allows air to enter or exit (suction or exhaust) to depressurize or pressurize the interior of the holder channel 74 via the depressurization pipe 76 or the pressurization pipe 77.

The positioning pin 73 is erected at a predetermined position of the mounting surface of the holder 71, and serves as a guide for correctly setting the device 10 on the mounting surface of the holder 71. The specific method according to the movement of such reagent will be described later.

The temperature control unit 80 is a unit that performs the temperature control for efficiently performing the reaction of the reagent. As illustrated in FIG. 7, the temperature control aluminum block 81 that transfers heat is configured to protrude from the mounting hole provided on the mounting surface to be located at the same position as the mounting surface of the holder 71, in the holder 71 of the holder unit 70, thereby performing the temperature control on the reagent in the corresponding position via the membrane 25 of the device 10. In the illustrated example, the mounting hole is formed on the mounting surface of the holder 71 to face the temperature-controlled section 23c of the central portion of the bottom surface of the device resin body lower part 23, and the temperature control aluminum block 81 is adapted to face the temperature-controlled section 23c of the device 10.

In regard to the temperature control itself, for example, in the STR analysis, the PCR reaction or the thermal denaturation after performing the PCR reaction is a typical reaction, and for example, it is conceivable to repeat a temperature cycle such as 60° C., 75° C. or 95° C. in the PCR reaction and thereafter to store the temperature around the room temperature or 4° C. Further, it is considered to give heat and hold heat for several minutes, for example, around 90° C. in the thermal denaturation and instantly lower the temperature around 4° C. They are different for each analysis and for each design of reagent specified by each reagent manufacturer. Therefore, in the holder unit 70, the temperature control aluminum block 81 as a heat source for heating and cooling using a Peltier element or the like to smoothly perform variety of temperature controls on the mounted device 10 is provided such that its heating and cooling surface faces the mounting surface of the holder 71, and a cooling mechanism such as a heat dissipating fin 82 and a cooling fan 83 for rapidly cooling the holder unit 70 is assembled to the holder unit 70. Further, regarding the cooling mechanism, other than the air cooling mechanism as described in FIG. 6, the cooling mechanism of the water-cooling type in which liquid such as antifreeze is used a medium of heat exchange is also generally known, and the mechanism tends to increase as a unit, but is a preferred example depending on the needed performance.

In the illustrated liquid sending temperature control system 60, the holder 71 is designed so that maximally four devices 10 can be set on the mounting surface, and FIGS. 6 and 7 illustrate an aspect in which three devices are already set, and the last one is set.

When setting the device 10 to the holder 71, the device 10 is set from the top of the mounting surface of the holder 71, and its positioning is provided by the engagement or the like between the positioning pins 73 provided on the holder unit 70 and the positioning through-holes 19 of the device 10. Further, the positioning method of the device 10 using the positioning pins 73 is an example, and for example, depending on the structure of the device itself and the structure of the lid 85 to be described below (see FIG. 8), the accurate positioning can be provided, even without using the positioning pins 73. Thus, as long as the positioning accuracy is high, other methods may be used, and a method of setting the device 10 by sliding from the side or a method of setting the device by being assembled to the lid 85 may be used. Along with this, it is also possible to omit the device body 20 illustrated in FIG. 2 or the positioning through-holes 29 and 39 of the PTP packaging sheet 30 in the device 10.

In the present embodiment, the communication/shutoff control channel for moving the reagent or the like between the predetermined device channels 23a in the device 10 corresponds to a predetermined portion of the device channel 23a corresponding to the flow rate control section 40 formed on the bottom surface of the device resin body lower part 23, and a recess-shaped or groove-like holder channel 74 formed by being located to correspond to the mounting surface of the holder 71 so as to connect the predetermined portions of the device channel 23a to each other, of the device channels 23a of the device 10, in the state in which the device 10 is mounted on the mounting surface of the holder 71 in the holder unit 70.

Further, on the mounting surface of the holder 71, a convex rib (not illustrated) is formed so as to surround the periphery of the groove opening of the holder channel 74 by being located in the groove opening edge of the holder channel 74 or the vicinity thereof, and meanwhile, in the device 10, on the bottom surface of the device resin body lower part 23 that faces the mounting surface of the holder 71 with the membrane 25 interposed therebetween, a concave groove (not illustrated) capable of engaging with the convex rib of the holder channel 74 is formed. Further, of the inner portion of the portion surrounded by the concave groove, on the bottom surface of the device resin body lower part 23, a predetermined portion of the device channel 23a constituting the aforementioned flow rate control section 40 is disposed.

Thus, in a state in which the device 10 is assembled by being mounted on the mounting surface of the holder 71 of the holder unit 70, when the pressing force of pressing the device 10 against the mounting surface of the holder 71 in the holder unit 70 is applied to the convex portion in the pocket 16 of the PTP packaging sheet 30 constituting the device 10, the convex rib of the holder channel 74 formed on the mounting surface of the holder 71 is engaged with the concave groove of the device resin body lower part 23 with the membrane 25 interposed therebetween. By the convex rib of the holder channel 74 and the concave groove of the device resin body lower part 23, a predetermined portion of the device channel 23a as the flow rate control section 40 is sealed with respect to the opening edge portion or the like in the corresponding sheet opening 24a of the membrane sticking sheet 24, on the outside of the concave groove periphery. This is a sealing configuration of a spigot structure, for performing the sticking between the membrane 25 and the device resin body lower part 23 using the membrane sticking sheet 24, and for preventing the reagent from strongly touching the sheet 24. When the sticking between the membrane 25 and the device resin body lower part 23 via the membrane sticking sheet 24 can be performed in a strong way for wetting and temperature changes of the liquid, a rib structure is not required in the groove opening edge of the holder channel 74 or the vicinity thereof. Also, when it is possible to provide a channel capable of controlling the movement of the reagent in some way in the device 10, the holder channel 74 can be omitted.

Here, although assembling of the device 10 to the holder unit 70 corresponds to the process described as the aforementioned step S3, as in the sample device A according to FIG. 5, in the case of a device in which a user needs to drip the sample 51 to the sample enclosing well 14, before and after the assembling operation, the sample 51 is applied to the sample enclosing well 14 via the through-hole 17. For example, in the case of the STR analysis, an example of the sample 51 is provided such that cells in the mouth of a subject are scraped using a swab-like collection tool called a swab, and DNA is extracted from the cells. In this case, a processing method of putting the DNA extraction liquid after DNA extraction as the sample 51 into the sample enclosing well 14, or a method of accumulating the DNA extraction liquid in the sample enclosing well 14 and putting the tube from which the swab is extracted into the sample enclosing wells 14 may be adopted as an example.

Figure 8:
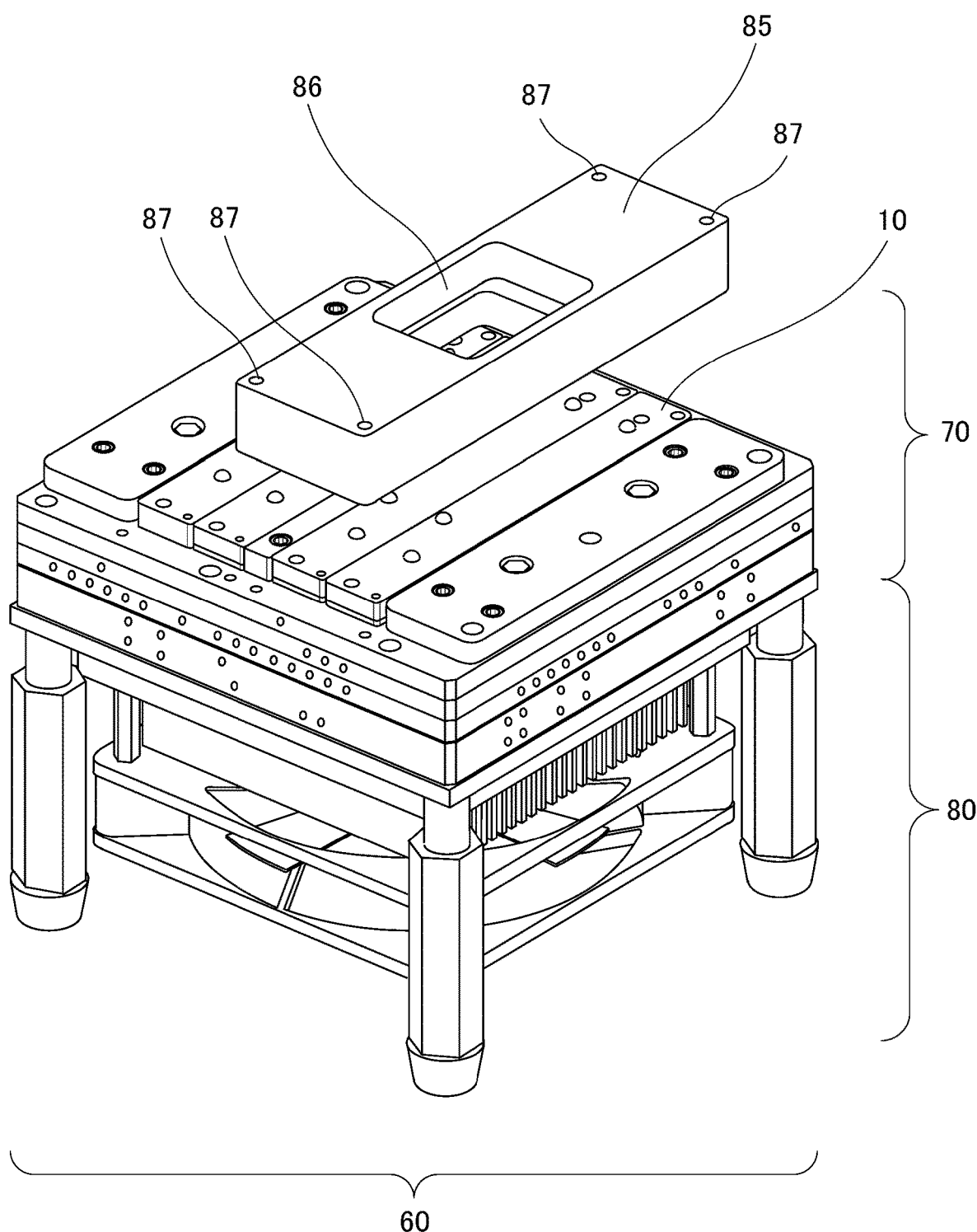
FIG. 8 is a state diagram before a lid is attached at the time of attaching the lid to the liquid sending temperature control system.
Figure 9:
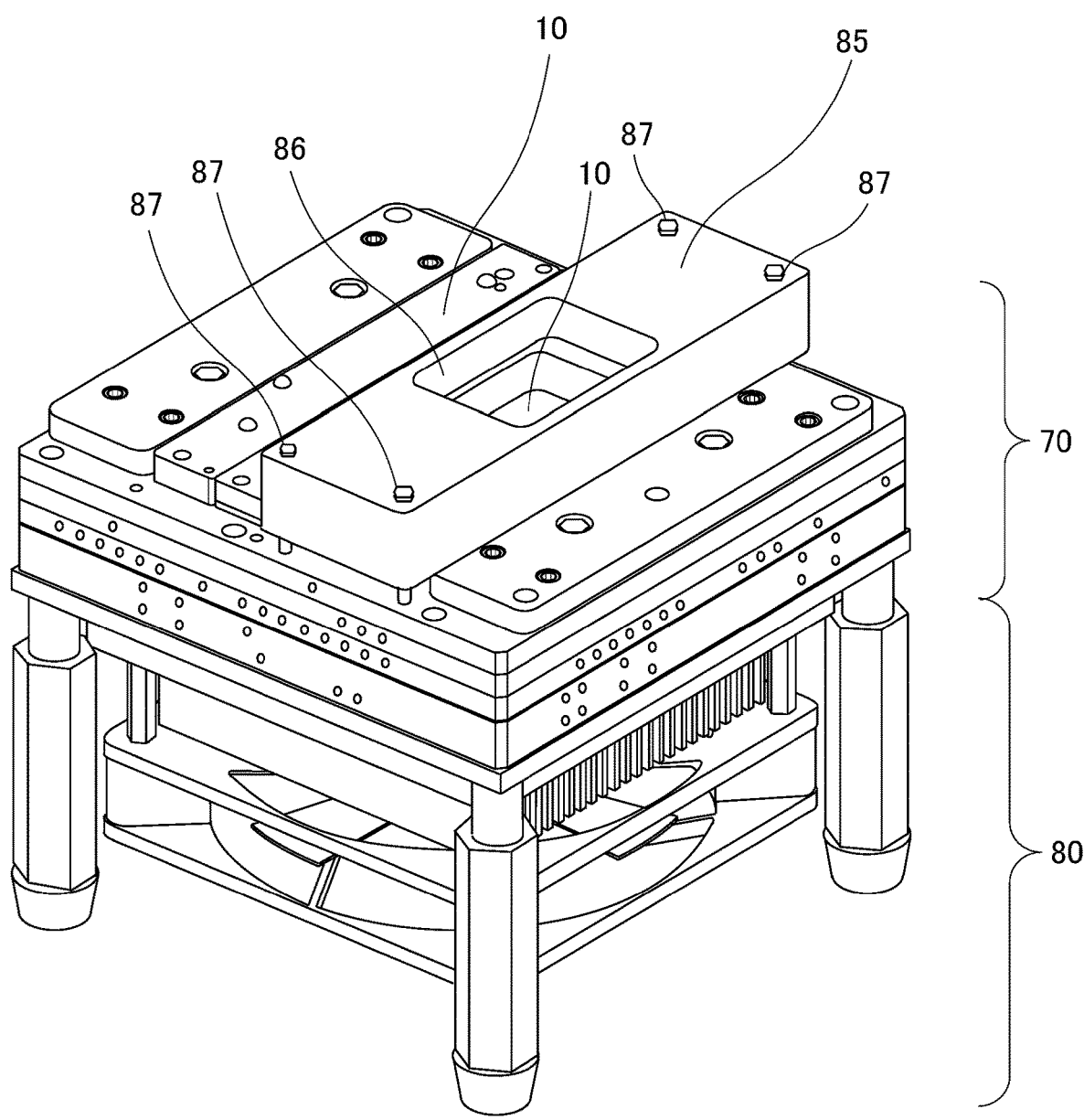
FIG. 9 is a state diagram after the lid is attached at the time of attaching the lid to the liquid sending temperature control system.

FIGS. 8 and 9 are explanatory views when attaching the lid to the liquid sending temperature control system. FIG. 8 illustrates a state before the lid is attached, and FIG. 9 illustrates a state after the lid is attached.

The lid 85 is a mechanism that is necessary when strongly assembling the device 10 to the holder unit 70 so that a predetermined pressing force is generated. Especially when the device resin body upper part 21 and the device resin body lower part 23 are manufactured by molding, since it is considered that there is a risk of an occurrence of warping in the device 10, there is a need for rigidity for correcting the top and bottom surfaces of the device resin body upper part 21 and the device resin body lower part 23 as a flat surface.

Further, when performing the PCR reaction, if the liquid sending temperature control system 60 performs the temperature control of the device 10, in order to control the heat radiation from the side of the lid 85, it is considered that there is a need to attach a thermal insulation system for keeping a constant temperature such as, for example, 25° C. and 60° C. in the lid 85. The thermal insulation system is a mechanism widely known as a heat lid heat in a thermal cycler that is a dedicated device for performing the PCR reaction, and rises to the vicinity of 105° C. depending on the reaction system. Therefore, considering that the temperature is not transmitted well via the lid 85, in this embodiment, the lid 85 is formed with a thermal insulation system mounting section 86 made up of a stepped throughbore for causing the thermal insulation system directly to face the reaction system, and the thermal insulation system can be integrally incorporated into the lid 85.

Although the lid 85 is provided with four screw holes 87 on the assumption of screw tightening in the illustrated example related to fixing to the holder unit 70, as a method of fixing to the holder unit 70, a method of allowing the device 10 to be strongly assembled to the holder unit 70 to generate the predetermined pressing force, and for example, a mounting method using a hinge structure or the like for the user's convenience are also used as an example.

In accordance with the types A to D of the devices 10 used for analysis as illustrated in FIG. 5, at the positions corresponding to each of the plurality of pockets 16 formed in the PTP packaging sheet 30, reagent extruding sections 88 for pressing and crushing the pocket 16 (see FIGS. 10[I] and 10[II]) are provided to protrude from the facing surface of the lid 85 that faces the device 10. Further, as mentioned above, when the device 10 is configured by selecting the corresponding base sheet 31 from the plurality of types of base sheets 31 in which the number and arrangement of the pockets 16 prepared for each type of the devices A, B, C and D are different from each other, the reagent extruding section 88 for pressing and crushing the pocket 16 does not need to protrude to the device facing surface of the lid 85, and in this case, the flat device facing surface itself of the lid 85 serves as the reagent extruding section 88 for pressing and crushing the pocket 16.

Figure 10:
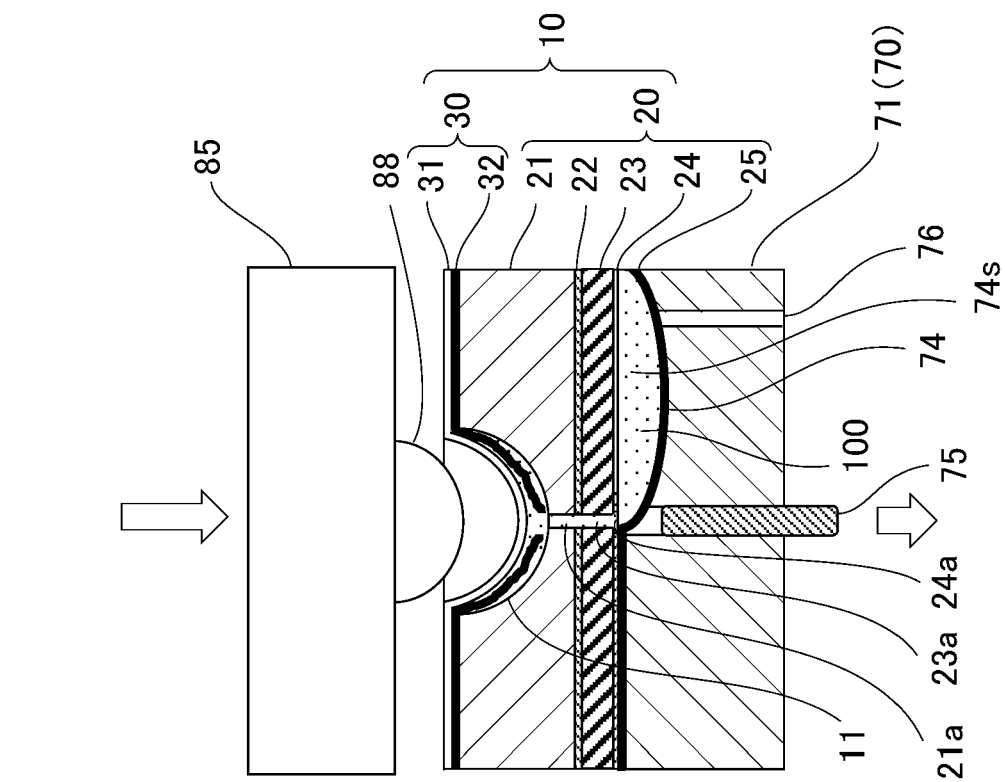
FIGS. 10[I] and 10[II] are explanatory views of a procedure of dripping reagents stored in the pocket of a PTP packaging sheet to the reagent dripping well of the device body inside the device.
Figure 10:
Figure 10:
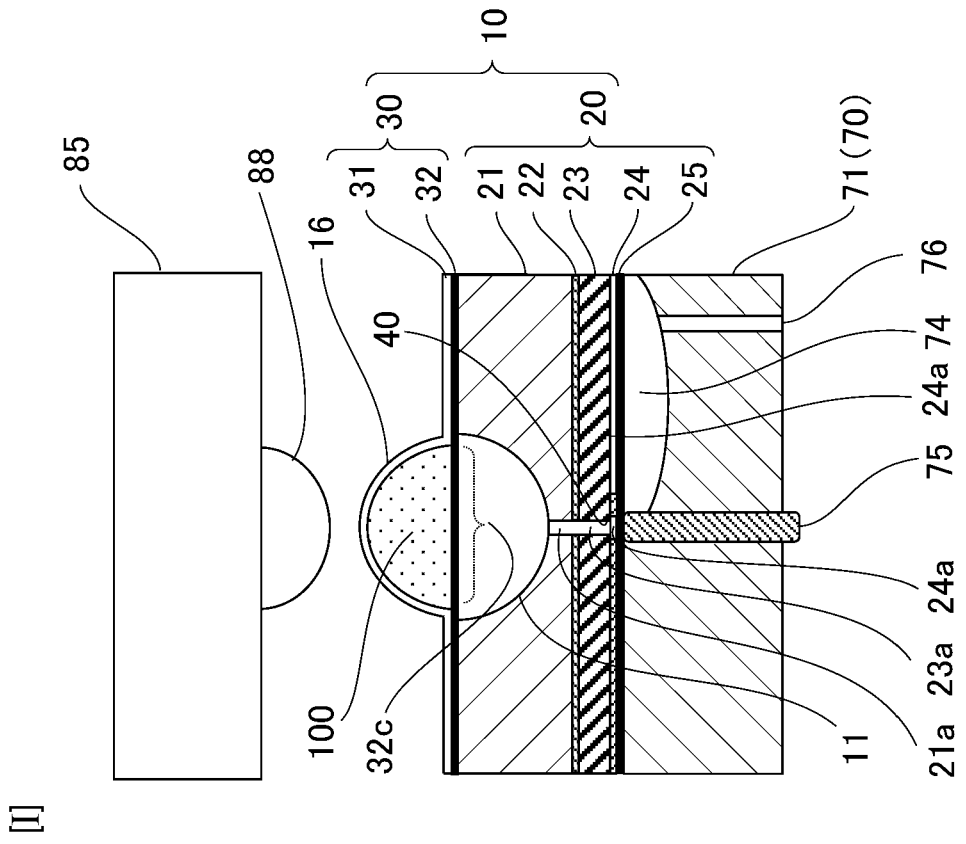

FIGS. 10[I] and 10[II] are explanatory views of a procedure of dripping the reagent contained in the pocket of the PTP packaging sheet to the reagent dripping well of the device body, in the interior of the device.

FIG. 10[I] corresponds to the process described as the aforementioned step S3, and FIG. 10[II] corresponds to the process described as the aforementioned steps S4 and S5.

The user drips the reagent 100 contained in the pocket 16 of the PTP packaging sheet 30 into the reagent dripping well 11 of the device body 20, when using the liquid sending temperature control system 60. At that time, first, the user sets the device 10 on the holder 71 of the liquid sending temperature control system 60 (step S3).

In a state in which the device 10 is set on the holder 71, since the membrane 25 is brought into close contact with the flow rate control section 40 of the device 10 by the channel sealing pin 75 displaced by protruding from the holder 71, the flow rate control section 40 is closed. In the illustrated example, the opening of one of the predetermined device channels 23a located on the holder channel 74 and communicating with the reagent dripping well 11 corresponds to the flow rate control section 40.

Thus, the reagent dripping well 11 and the device channel 23a do not communicate with other predetermined device channels 23a in the device body 20 and the well communicating via the predetermined device channel 23a, and meanwhile, the sealed state is also maintained to the outside of the device 10.

Thereafter, the lid 85 covers the device 10 mounted on the holder 71 automatically or manually by the user (step S4).

Here, the convex shape of the reagent extruding section 88 formed on the facing surface of the lid 85 which faces the device 10 is formed to be engageable with the bowl-like concave shape of the reagent dripping well 11. For example, the reagent extruding section 88 has a gap equal to or greater than a total of the thicknesses of the base sheet 31 and the top sheet 32 in the PTP packaging sheet 30 between the reagent extruding section 88 and the inner surface of the reagent dripping well 11, in the state in which the facing surface other than the reagent extruding section 88 of the lid 85 abuts against the base sheet 31 (the top surface of the base sheet 31 illustrated in FIG. 2) other than the pocket 16 in the PTP packaging sheet 30 of the device 10, and thus, the reagent extruding section 88 has a dimension and a shape capable of being loosely fitted to the reagent dripping well 11.

Meanwhile, the opening of the reagent dripping well 11 has a dimension that allows the overall pocket opening cover section 32c facing the top sheet 32 to be located inside the opening edge. Further, when an original bowl shape is crushed by pressing of the reagent extruding section 88 and the pocket opening cover section 32c bulges inside the reagent dripping well 11, the pocket 16 of the base sheet 31 is pushed into the reagent dripping well 11 so that the crushed bowl shape does not protrude outward from the opening edge of the reagent dripping well 11.

As illustrated in FIG. 10[I], after covering the device 10, when the lid 85 is further pressed automatically or manually by the user and is pressed against the device 10 and the holder 71, the original bowl shape, that is, a hollow convex shape of the pocket 16 formed on the base sheet 31 of the PTP packaging sheet 30 is crushed by pressing of the reagent extruding section 88 against which the pocket 16 abuts, and along with this, the pocket opening cover section 32c of the top sheet 32 is pressed via the reagent 100 and bulges by being bent into the reagent dripping well 11. Further, when the magnitude of the pressing force transmitted via the reagent 100 by pressing of the reagent extruding section 88 exceeds the bending limit, the pocket opening cover section 32c of the top sheet 32 that bulges in the reagent dripping well 11 is ruptured in the reagent dripping well 11. Thus, since the reagent 100 inside the pocket 16 is made to outflow or can be made to outflow from the inside of the pocket 16 via a ruptured portion of the pocket opening cover section of the base sheet 31, the reagent is dripped into the reagent dripping well 11 of the device body 20 as it is (step S5).

At that time, the convex shape of the reagent extruding section 88 of the lid 85 has a dimension and a shape capable of being loosely fitted to the reagent dripping well 11, the opening of the reagent dripping well 11 has a dimension capable of including the entire pocket opening cover section 32c of the device 10, and the pocket 16 of the device 10 is pushed into the reagent dripping well 11. Thus, the bulging pocket opening cover section 32c of the top sheet 32 is ruptured in the reagent dripping well 11, it is possible to suppress the dripping leakage of the reagent stored in the pocket 16 to the reagent dripping well 11.

Further, the reagent dripped into the reagent dripping well 11 by rupturing of the pocket opening cover section 32c of the top sheet 32 in the reagent dripping well 11 is in a state of being interposed and compressed to the base sheet 31 in the reagent dripping well 11. At that time, air which is sealed in the reagent dripping well 11 from the beginning is in the compressed state.

In a state in which the reagent 100 is dripped into the reagent dripping well 11 from the pocket 16 and the internal pressure of the reagent dripping well 11 increases, when the channel sealing pin 75 displaced to protrude is displaced to retreat, and the air in the holder channel 74 is exhausted and removed by the depressurization pipe 76, the membrane 25 part which the device resin body lower part 23 can directly face via the sheet opening 24a on the inner side than the convex rib surrounding the groove opening of the holder channel 74 in the device 10 is not stuck to the membrane sticking sheet 24. Thus, as illustrated in FIG. 10[II], the membrane 25 is deformed to bulge into the holder channel 74 so as to abut against the inner wall thereof. Thus, the reagent stored in the reagent dripping well 11 by dripping, and the atmosphere in the compressed device 10 flows into a holder channel space 74s generated between the membrane 25 part deformed to bulge in the holder channel 74 and the device resin body lower part 23. Accordingly, it is possible to send the reagent to another device channel 23a which is directly connected to the holder channel 74 or is similarly connected to the holder channel 74 via the flow rate control section 40.

Thus, in the device 10 of the present embodiment, dripping of the reagent to the reagent dripping well 11, and the movement preparation of reagent from the reagent dripping well 11 can also be performed such that the reagent is not exposed to the outside atmosphere of the periphery of the device 10.

Next, a modified example of the procedure for dripping the reagent 100 contained in the pocket 16 of the PTP packaging sheet 30 to the reagent dripping well 11 of the device body 20 in the interior of the device 10 described in FIGS. 10[I] and 10[II] will be described with reference to FIG. 11.

Figure 11:
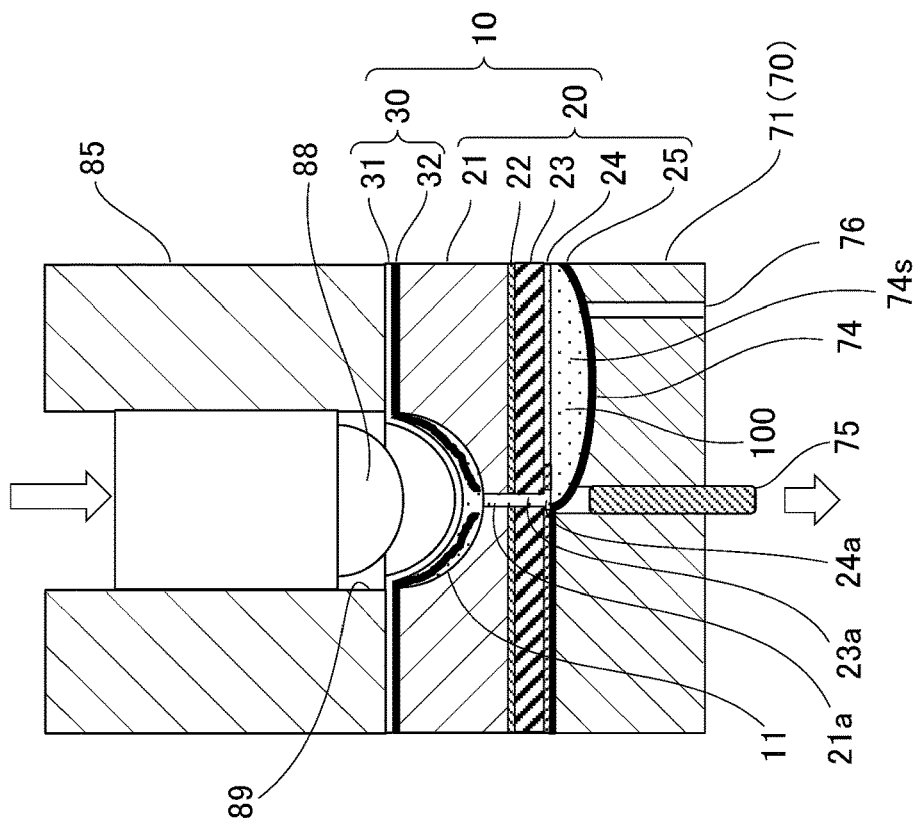
FIGS. 11[I] and 11[II] are explanatory views of a modified example of a procedure of dripping reagents stored in the pocket of a PTP packaging sheet to the reagent dripping well of the device body inside the device.
Figure 11:
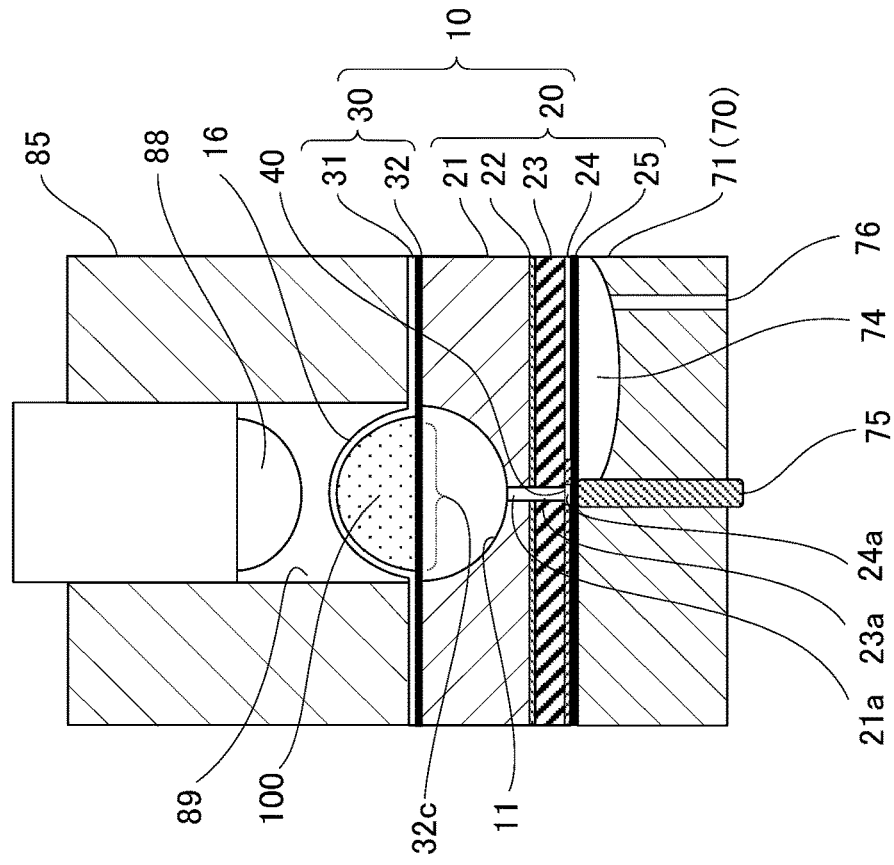

FIGS. 11[I] and 11[II] is an explanatory view of a modified example of the procedure for dripping the reagent stored in the pocket of the PTP packaging sheet to the reagent dripping well of the device body in the interior of the device.

FIG. 11[I] corresponds to the process described as the aforementioned step S3, and FIG. 11[II] corresponds to the process described as the aforementioned steps S4 and S5.

In the present embodiment, the reagent extruding section 88 (see FIGS. 10[I] and 10[II]) on the facing surface facing the device 10 is provided to be displaceable to the lid 85 automatically or manually by the user, rather than being formed to directly protrude from the lid 85. Therefore, in step S3, after the device 10 is set on the holder 71 of the liquid sending temperature control system 60, in step S4, after the device 10 mounted on the holder 71 is covered with the lid 85 automatically or manually by the user, and in step S5, by displacing the reagent extruding section 88 with respect to the lid 85 along the thickness direction, the pocket 16 of the base sheet 30 is pushed into the reagent dripping well 11.

Thus, although there is no change in the effect of dripping the reagent 100, since the reagent extruding section 88 is an independent drive system, there is an advantage even if the timing at which the holder 71 with the device 10 set thereon is covered with the lid 85 may not be simultaneous with the timing at which the pocket 16 of the device 10 is crushed by the reagent extruding section 88 to drip the reagent 100. Thus, each reagent 100 can be dripped just before the use as long as the driving of each of the reagent extruding sections 88 is individually controlled by the program control. That is, it is useful when it is desirable that the reagent 100 is not dripped to the reagent dripping well 11 just before the use.

As a case in which the reagent 100 is stored in the interior of the PTP packaging sheet 30 until just before the use, for example, the following case can adopted as an example.

Case 1: a case where the reagent 100 is very small amount, and there is a need to consider the water vapor permeability of the device body 20.

Case 2: a case where the reagent 100 is very small amount, and the capacity of the pocket 16 is large in contrast thereto, and thus, when enclosing the reagent 100 in the interior of the pocket 16, the interior of the pocket 16 cannot be filled with the reagent 100 and the air is enclosed. In other words, a case where the moisture of the reagent 100 is evaporated to the air layer in the pocket 16 until the user uses the device 10, and there is a need to condensate and return the moisture of the vaporized reagent by attaching the cooling mechanism to the lid 85.

Case 3: a case of cooling until just before the use, by attaching the cooling mechanism to the lid 85, since the reagent 100 is influenced by temperature.

Further, according to the present embodiment, by the guide hole 89 of the reagent extruding section 88 formed in the lid 85, the deformation of the pocket 16 of the device 10 is regulated when being crushed, and the configuration portion of the base sheet 31 of the crushed pocket 16 portion does not protrude outward from the opening edge of the reagent dripping well 11. Thus, in regard to the shape and material of the pocket 16, without protruding outward from the opening edge of the reagent dripping well 11 when being crushed, and the restriction such as being pushed into the reagent dripping well 11 is relaxed, and the degree of freedom of material design of the PTP packaging sheet 30 and the pocket 16 is enhanced.

Next, a modified example of the storage form of the reagent stored in the pocket 16 of the PTP packaging sheet 30 of the device 10 will be described with reference to FIG. 12.

Figure 12:
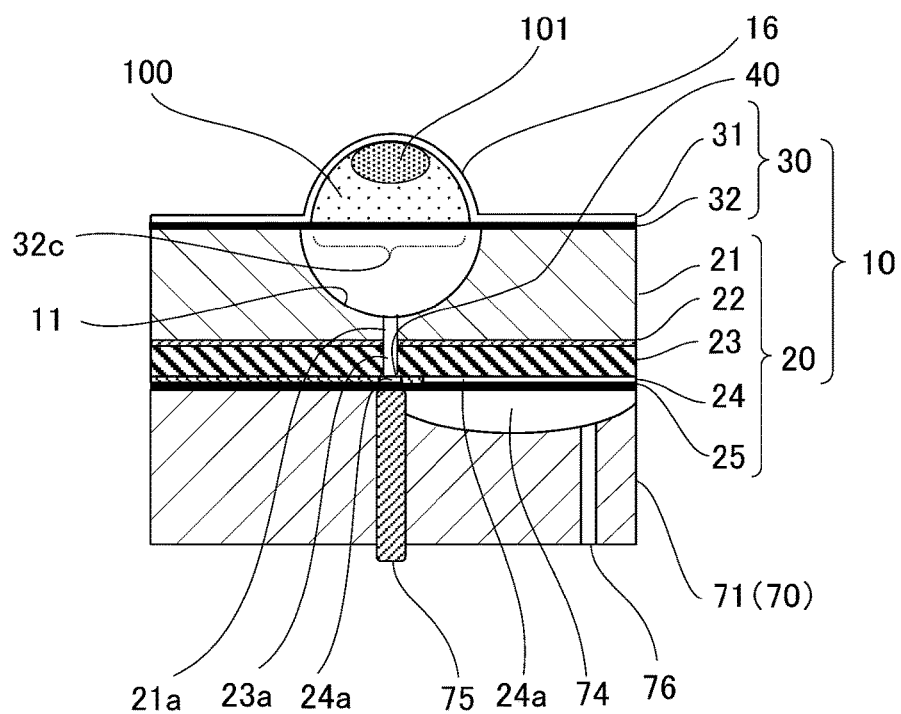
FIG. 12 is an explanatory view of a modified example of a housing aspect of the reagents to the PTP packaging sheet pocket making up the device.

FIG. 12 is an explanatory view of a modified example of the storage form of the reagent to the pocket of the PTP packaging sheet making up the device.

To provide an inexpensive device to the user, it is important to minimize the reagent volume (hereinafter, also referred to as a dead volume) that is not actually used of the reagent quantity 100 to be sealed in the pocket 16 as far as possible. Therefore, when the required reagent 100 is very small amount, oil 101 instead of the dead volume of the reagent 100 is enclosed inside the pocket 16, together with a small amount of reagent 100.

Thus, the moisture of a small amount of reagent 100 is not evaporated, and it is possible to effectively drip the reagent 100 in the interior of the reagent dripping well 11 of the same device by the crushing of the pocket 16 of the device 10, using a specific gravity relation between the reagent 100 and the oil 101.

The oil 101 desirably has a composition that does not impair the chemical reaction when the reagent 100 is subjected to temperature control, and mineral oil is generally often used. The mineral oil and the reagent are separated from each other in a short period of time due to the difference in specific gravity even when mixed. Furthermore, when combined with the method described in FIGS. 10 and 11, in addition to the advantage of suppressing the water vapor permeability and facilitating the heat transfer, there is an advantage such as reduction in absolute amount of the reagent contained in the remaining liquid when the reagent 100 is pressed from the pocket 16.

Next, among the aforementioned device channels 23a in the device 10, the movement procedure of the reagent 100 using the holder channel 74 will be described with reference to FIG. 13.

Figure 13:
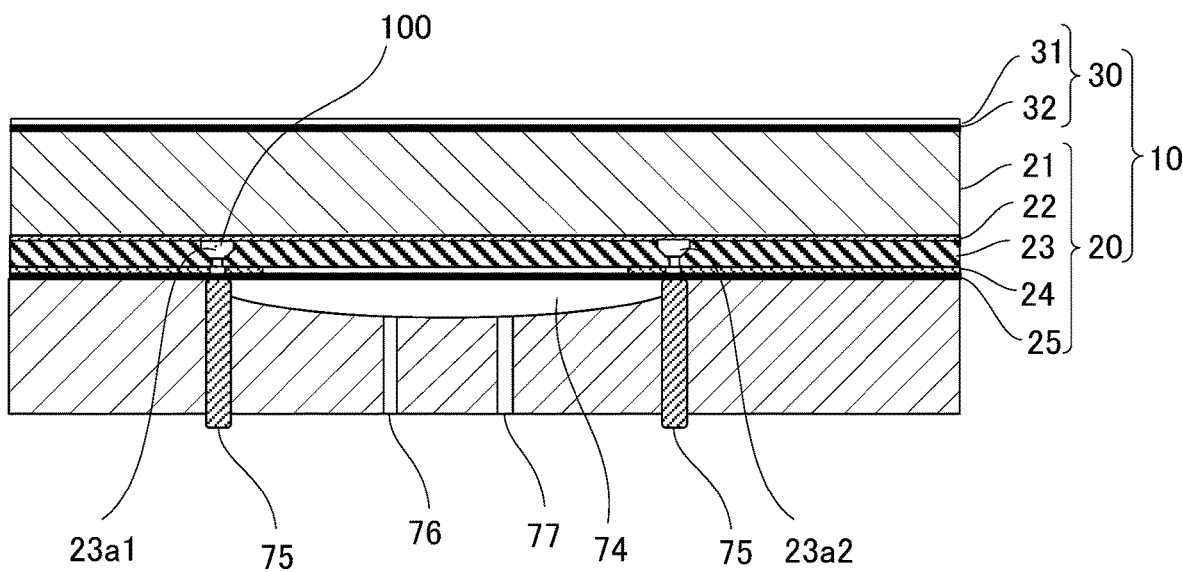
FIG. 13 is an explanatory view of a movement procedure of the reagents using a holder channel between device channels inside the device.

FIG. 13 is an explanatory view of a transfer procedure of the reagent using the holder channel between the device channels in the interior of the device.

When the reagent 100 stored in a device channel 23a1 of the liquid sending source is sent to a device channel 23a2 of the liquid sending location, the reagent is moved in the following procedure.

First, the channel sealing pin 75 which cuts off the device channel 23a1 of the liquid sending destination with respect to the holder channel 74 is displaced to the retreated state from the protruding state, and the air in the holder channel 74 is exhausted and removed by the depressurization pipe 76. Thus, on the inner side than the convex rib that surrounds the groove opening of the holder channel 74, the membrane 25 part which the device resin body lower part 23 can directly face via the sheet opening 24a is not stuck with the membrane sticking sheet 24, the membrane 25 part is deformed to bulge into the holder channel 74 so as to abut against the inner wall.

Thus, the reagent 100 stored in the device channel 23a1 of the liquid sending destination flows into the holder channel space 74s (see FIG. 10[II]) that is generated between the membrane 25 part deformed to bulge in the holder channel 74 and the device resin body lower part 23.

Further, if only the required amount of reagent 100 flows into the holder channel space 74s from the device channel 23a1, in order to shut off the device channel 23a1 of the liquid sending destination with respect to the holder channel 74, the channel sealing pin 75 is displaced in the protruding state from the retreat state.

Next, in order to send the reagent 100 stored in the holder channel space 74s to the device channel 23a2 of the liquid sending location, the channel sealing pin 75 which shuts off the device channel 23a2 of the liquid sending destination with respect to the holder channel 74 is displaced to the retreated state from the protruding state, air is introduced into the space between the membrane 25 part deformed to bulge in the holder channel 74 by the pressurization pipe 77 and the groove wall of the holder channel 74 to compress the holder channel space 74s, and the reagent 100 stored in the holder channel space 74s is fed to the device channel 23a2 of the sending location.

Accordingly, in the device 10, by applying such a movement procedure, between the predetermined well and the predetermined device channel or the like, the liquid feeding or the liquid sending of the reagent or the like are performed.

While an embodiment of the device for storing biochemical reagent and the biochemical analyzer according to the present invention has been described on the basis of the sample preparation of STR analysis as an example, the specific embodiments thereof is not limited to the aforementioned modified example, and various modified examples are applicable.

For example, in the illustrated embodiment, as illustrated in FIG. 1, the device body 20 of the device 10 was configured to be provided in a sealed state by being stuck to the PTP packaging sheet 30. Specifically, the device body 20 was configured by sticking the device resin body upper part 21 constituting the device body 20 illustrated in FIG. 2 and the top sheet 32 constituting the PTP packaging sheet 30 illustrated in FIG. 3.

The efficiency is good if providing the set of the reagent stored in the PTP packaging sheet 30 and the device 10 to the user. However, considering that more devices 10 are consumed and are provided to the users who use the set several times in a day, there is a disadvantage of excessively using the storage destination as much as the volume of the device body 20. Many of the reagents often require around 2° C. to 8° C. as a storage temperature, and the user often needs to prepare a refrigerator.

As one of other forms that solve the problem, a method of providing the device body 20 and the PTP packaging sheet 30 in a separated state, after sealing the device body 20 by sticking a sheet similar to the top sheet 32.

When providing the device body 20 and the PTP packaging sheet 30 in the separated state, there is a need to make a scheme such that heat welding, sticking or the like can be performed on at least one of them to stick the device body 20 and the PTP packaging sheet 30 by the user's hand, and a scheme of an apparatus, a jig or the like such that the user can weld them at hand. For example, one example is configured so that, in the case of thermal welding, when the lid 85 is mounted in the processes of the aforementioned steps S3 and S4, the lid 85 is provided with a heat source and is welded.

Alternatively, in the process of the aforementioned steps S3 and S4, as long as the sealing between the device body 20 and the PTP packaging sheet 30 is ensured, they may be pressed.

Thus, it is possible to obtain a system in which the device body 20 is also provided to the user, while maintaining a sealed state until use, and only the PTP packaging sheet 30 storing the reagent may be preserved in a temperature-managed environment.

REFERENCE SIGNS LIST 10 device
11 reagent dripping well
12 agitating well
13 waste liquid well
14 sample enclosing well
15 detection well
16 pocket
17 through-hole
19 positioning through-hole 20 device body
21 device resin body upper part
21a well passage
21b positioning through-bore
22 resin body sticking sheet
22a sheet communication hole
22b positioning through-bore
23 device resin body lower part
23a device channel
23b positioning through-bore
23c temperature-controlled section
24 membrane sticking sheet
24a sheet opening
24b positioning through-bore
25 membrane
25b positioning through-bore
29 positioning through-hole
30 PTP packaging sheet
31 base sheet
31a through-bore
31b positioning through-bore
32 top sheet
32a through-bore
32b positioning through-bore
32c pocket opening cover section
39 positioning through-hole
40 flow rate control section
51 samples
52 primer mix
53 master mix
54 formamide
55 negative control DNA
56 positive control DNA
57 allelic ladder
58 fragment DNA for size standard
60 liquid sending temperature control system
70 holder unit
71 holder
72 pneumatic pipe connector
73 positioning pin
74 holder channel
75 channel sealing pin
76 depressurization pipe
77 pressurization pipe
80 temperature control unit
81 temperature control aluminum block
82 heat dissipating fin
83 cooling fan
85 lid
86 thermal insulation system mounting section
87 screw hole
88 reagent extruding section
89 guide hole
100 reagent
101 oil All of the publications, patents and patent applications cited in this specification are incorporated herein as a reference as they are.

The invention claimed is:

1. A device for storing biochemical reagent comprising:
a device body in which an opening of a dripping space on which reagent is dripped is formed on a joining surface; and
a reagent storage container that has an enclosed space in which the reagent is enclosed, the opening of the enclosed space being integrally sealed by a joint that forms a joining surface with the device body,
wherein in a state in which the joining surfaces of the device body and the reagent storage container are joined to each other by aligning positions of the dripping space and the enclosed space, when an outer wall of the enclosed space of the reagent storage container is pushed, a sealed portion that seals the opening of the enclosed space in the joint is configured to be ruptured by being deformed into the dripping space of the device body, wherein the enclosed space is configured such that, upon being ruptured, an outer surface of the enclosed space forms a shape that is substantially complementary to a shape of the dripping space,
the reagent storage container is made up of a base sheet member in which a plurality of enclosed spaces is formed, and a top sheet member that forms the joint,
the top sheet member is joined and fixed to the base sheet member in a state in which the different reagents are stored in the plurality of enclosed spaces, to seal each of the plurality of enclosed spaces,
the reagent storage container is configured by joining and fixing the top sheet member of the same configuration to the base sheet member in which at least one of a set of numbers, a set of shapes, or a set of arrangements of the enclosed spaces are different in accordance with a difference in patterns of each of the different reagents enclosed in each of the plurality of enclosed spaces, regardless of differences in the set of numbers, the set of shapes, or the set of arrangements of the enclosed spaces of the base sheet member, and the enclosed space and the dripping space have substantially the same shape.

2. The device for storing biochemical reagent according to claim 1, wherein when the device is used, the joining surfaces of the device body and the reagent storage container are joined to each other, by aligning each of the corresponding positions of the dripping space and the enclosed space.

3. The device for storing biochemical reagent according to claim 1, wherein the reagent storage container is made up of a Press Through Packages (PTP) packaging sheet.

4. The device for storing biochemical reagent according to claim 1, wherein in the enclosed space of the reagent storage container, oil having a composition that does not impair the chemical reaction at the time of temperature control of the reagent is enclosed together with the reagent.

5. The device for storing biochemical reagent according to claim 1, wherein the dripping space has a bowl shape, and a passage that sends the reagent downward in the device body is further provided at the bowl-shaped bottom.

* * * * *